(12) United States Patent
Moore

(10) Patent No.: US 11,262,244 B2
(45) Date of Patent: Mar. 1, 2022

(54) MOTION DETECTION SYSTEM WITH DUAL SENSOR MOTION DETECTORS

(71) Applicant: Orange Peel Projects, Inc., Walpole, MA (US)

(72) Inventor: Tal Moore, Seattle, WA (US)

(73) Assignee: Orange Peel Projects, Inc., Walpole, MA (US)

( * ) Notice: Subject to any disclaimer, the term of this patent is extended or adjusted under 35 U.S.C. 154(b) by 0 days.

(21) Appl. No.: 16/902,103

(22) Filed: Jun. 15, 2020

(65) Prior Publication Data

US 2020/0408602 A1    Dec. 31, 2020

Related U.S. Application Data

(60) Provisional application No. 62/868,575, filed on Jun. 28, 2019.

(51) Int. Cl.
| | | |
|---|---|---|
| *G01J 5/10* | (2006.01) | |
| *G01J 5/00* | (2022.01) | |
| *G01P 13/00* | (2006.01) | |

(52) U.S. Cl.
CPC .............. *G01J 5/0022* (2013.01); *G01J 5/10* (2013.01); *G01P 13/00* (2013.01)

(58) Field of Classification Search
CPC .......... G01J 5/08; G01J 5/0025; G01J 5/0806; G01J 5/0846; G01J 5/0022; G01J 5/0809
See application file for complete search history.

(56) References Cited

U.S. PATENT DOCUMENTS

| | | | | |
|---|---|---|---|---|
| 7,211,798 B2* | 5/2007 | Wu | ...................... | G01D 11/245 |
| | | | | 250/342 |
| 7,560,696 B2* | 7/2009 | Wu | ...................... | G01D 11/245 |
| | | | | 250/342 |
| 7,573,032 B2* | 8/2009 | Zhevelev | .................. | G01J 5/08 |
| | | | | 250/339.14 |
| 7,875,852 B2* | 1/2011 | Zhevelev | ............... | G02B 5/208 |
| | | | | 250/332 |
| 9,367,143 B2* | 6/2016 | Wojtczuk | .............. | G01J 5/0831 |
| 2002/0020816 A1 | 2/2002 | Leen | | |

(Continued)

OTHER PUBLICATIONS

International Search Report and Written Opinion issued for PCT/US2020/039833, dated Nov. 5, 2020, 13 pp.

*Primary Examiner* — David P Porta
*Assistant Examiner* — Fani Boosalis
(74) *Attorney, Agent, or Firm* — Brooks Kushman P.C.

(57) ABSTRACT

The present invention is a motion detection system that will consistently report detected movement, while reducing the number of false reports. The motion detection system includes a receiver and a dual sensor motion detector. The dual sensor motion detector utilizes sensors mounted in a weatherproof chassis. The dual sensors are located at the same vertical height in the weatherproof chassis and separated by a predetermined distance from the center of the chassis. Each sensor is rotated at an angle away from the center of the chassis. Each sensor has a coverage area dictated by its viewing angle (or field-of-view) and viewing distance. By utilizing dual sensors, a user can set the dual sensor motion detector to an AND operation or an OR operation. Motion is detected when both sensors detect movement simultaneously or motion is detected when any one of the two sensors detects movement.

20 Claims, 21 Drawing Sheets

(56) References Cited

U.S. PATENT DOCUMENTS

2007/0018106 A1\* 1/2007 Zhevelev .............. G01J 5/0806
                                                        250/353
2015/0084517 A1    3/2015  Ayala et al.
2015/0382432 A1   12/2015  Eskonen et al.

\* cited by examiner

MOTION DETECTION SYSTEM WITH DUAL SENSOR MOTION DETECTORS

RELATED APPLICATIONS

The present applications claims the benefit of priority to U.S. Provisional Patent Application Ser. No. 62/868,575 filed Jun. 28, 2019, entitled "Motion Detection System With Dual Sensor Motion Detectors", which is fully incorporated herein by this reference.

FIELD OF INVENTION

This invention relates to a motion detection system, and more particularly, to a motion detection system utilizing multiple motion detectors to monitor a specific area. More particularly, the motion detection system utilizes dual sensor motion detectors.

BACKGROUND OF THE INVENTION

A motion detector is a device that detects objects in motion and is often integrated as a component to a system, such as a security system or a motion capture camera. In the systems, the motion detector is configured to alert the system of motion in a designated area and generally perform an automated task. In the security system, the motion detector will trip an intruder alert in the designated area. In the motion capture camera, the motion detector will turn on the camera to record the designated area. Motion detectors vary in the type of sensors used to detect motion and based on the system, it may be more beneficial to choose a particular type of sensor used to detect motion over the other.

Microwave sensors, ultrasonic sensors, and more commonly, passive infrared sensors are used in motion detectors. Microwave sensors are designed to send and receive microwaves and triggers when a phase shift in the reflected microwaves is detected due to motion of an object relative to the position of the sensor. Ultrasonic sensors are designed similar to microwaves sensors, but instead use ultrasonic waves. Passive infrared sensors are designed to detect infrared energy and triggers when the infrared energy detected is altered from a standard state.

Microwave sensors have a higher sensitivity to movement and a higher coverage area than passive infrared sensors. However, microwave sensors consume more energy and are more expensive than passive infrared sensors. The microwave and ultrasonic wave sensors have a continuous field, whereas the passive infrared sensors have a slotted field. Both types of sensors are prone to miss object movement and prone to report false movement. Therefore, a need exists for a motion detector that consistently reports detectable movement while reducing the number of false reports.

In light of the above, it would be advantageous to provide a motion detection system with a motion detector having improved sensitivity and accuracy. It would further be advantageous to provide a motion detection system with a motion detector having improved efficiency. It would further be advantageous to provide a motion detection system with a motion detector with selectable options for improved sensitivity, accuracy, and efficiency.

SUMMARY OF THE INVENTION

The present invention is a motion detection system that will consistently report detected movement, while reducing the number of false reports. Furthermore, the present invention will be low-cost and energy efficient. The motion detection system includes a receiver and a dual sensor motion detector. The receiver is configured to pair with a single dual sensor motion detector for pin point coverage or with multiple dual sensor motion detectors to create a network of motion detectors to cover a larger area. The receiver is capable of notifying a user of the particular dual sensor motion detector that detects motion, which corresponds with a particular area of coverage. The dual sensor motion detectors are also designed to consistently detect movements, while reducing the number of false reports.

In the present invention, the dual sensor motion detector utilizes two passive infrared sensors mounted in a weatherproof chassis. In the present invention, the dual passive infrared sensors are located at the same vertical height in the weatherproof chassis and separated by a predetermined distance from the center of the chassis. Each passive infrared sensor is rotated 5 degrees along its axis away from the center of the chassis. Each passive infrared sensor has a coverage area dictated by its viewing angle (or field-of-view) and viewing distance. The dual sensor motion detector senses object movement when object movement is detected in at least one of the coverage areas of the dual passive infrared sensors.

The sensitivity and accuracy of the dual sensor motion detector is further improved by utilizing both passive infrared sensors. By utilizing dual passive infrared sensors, a dual coverage zone is created where the coverage area of both passive infrared sensors overlaps. The dual sensor motion detector senses object movement when object movement is detected in the dual coverage zone; both passive infrared sensors detect movement at the same time. The dual coverage zone ensures that object movement is correctly detected and false detections are minimized.

In an alternative embodiment, the dual sensor motion detector senses motion when both the first passive infrared sensor coverage area and the second passive infrared sensor coverage area detect movement within a certain period of time. In another alternative embodiment of the dual sensor motion detector, the dual sensor motion detector senses object movement when object movement is detected in the first passive infrared sensor coverage zone only, then in the dual coverage zone only, and then in the second passive infrared sensor coverage zone only. In yet another alternative embodiment of the invention, the dual sensor motion detector senses object movement when object movement is detected in the dual coverage zone for a predetermined duration of time; both passive infrared sensors detect movement at the same time for a duration of time. (Is the sensor utilizing any other types of motion sensing logic not presented in the current application?)

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Embodiments of the present invention are described herein in the context of motion detection system with dual sensor motion detectors. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Figure 1:
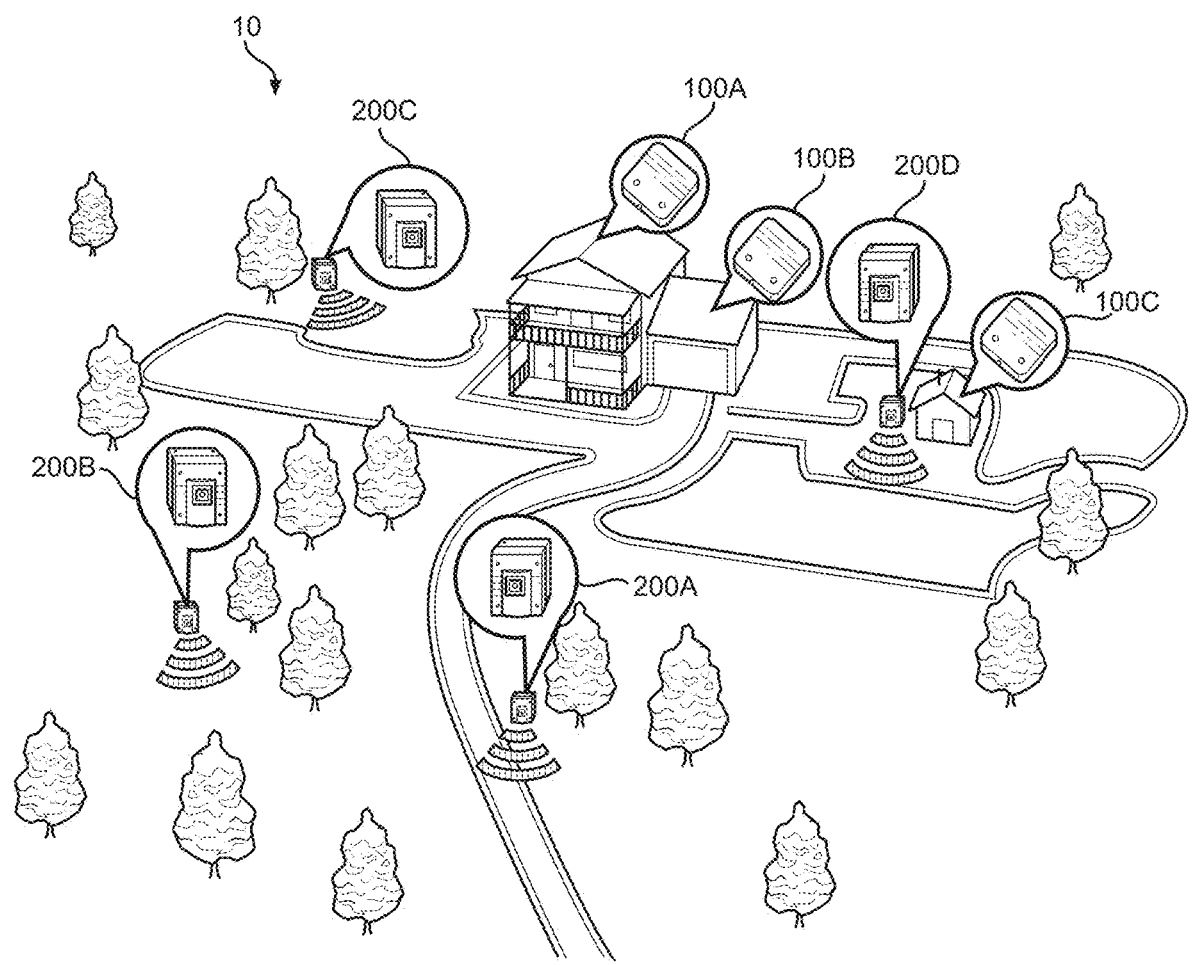
FIG. 1 is a diagram of the present invention, a motion detection system with dual sensor motion detectors.

Referring initially to FIG. 1, a diagram of the motion detection system with dual sensor motion detectors of the present invention is shown and generally designated as 10. The motion detection system 10 includes a network of receivers 100A, 100B, and 100C in communication with a network of dual sensor motion detectors 200A, 200B, 200C, and 200D. The dual sensor motion detector 200A is capable of communicating with a plurality of receivers 100A, 100B, and 100C concurrently. The receiver 100A is capable of communication with a plurality of dual sensor motion detectors 200A, 200B, 200C, and 200D concurrently as well. Each of the dual sensor motion detectors 200A, 200B, 200C, and 200D covers a particular area of the property and each receiver 100A, 100B, and 100C is located within a particular occupant zone.

The plurality of dual sensor motion detectors 200A, 200B, 200C, and 200D are in communication with each of the receivers 100A, 100B, and 100C. When dual sensor motion detectors 200A, 200B, 200C, or 200D senses object movement the receivers 100A, 100B, and 100C are simultaneously alerted. The receivers 100A, 100B, and 100C notifies the occupant which dual sensor motion detectors 200A, 200B, 200C, or 200D senses movement, thereby notifying the occupant the particular area of the property movement was detected. The motion detection system 10 provides an expandable system to completely monitor a property.

The dual sensor motion detectors 200A, 200B, 200C, and 200D are particularly adept for use in outdoor environments. Each of the dual sensor motion detectors 200A, 200B, 200C, and 200D are housed in a weatherproof chassis with an extended hood to protect the sensors from the elements. The dual sensor motion detectors 200A, 200B, 200C, and 200D are capable of withstanding hail storms, gusty winds, heavy rains, scorching heat, and snow. Due to its solid construction, the dual sensor motion detectors 200A, 200B, 200C, and 200D require minimal maintenance and upkeep. The dual sensor motion detectors 200A, 200B, 200C, and 200D are configured to be quickly and easily mounted to any surface.

The dual sensor motion detectors 200A, 200B, 200C, and 200D may be powered by a wall adapter or batteries. The use of batteries provides the capability to mount the dual sensor motion detectors 200A, 200B, 200C, and 200D in any location. The dual sensor motion detectors 200A, 200B, 200C, and 200D are able to communicate with the receivers 100A, 100B, and 100C up to a ¼ mile away. The range of the dual sensor motion detectors 200A, 200B, 200C, and 200D and the receivers 100A, 100B, and 100C is not meant to be limiting and it is contemplated that the range may be more or less than ¼ mile. By utilizing an appropriate number of dual sensor motion detectors 200A, 200B, 200C, and 200D with the receivers 100A, 100B, and 100C located at the center of the dual sensor motion detectors 200, the motion detection system 10 can provide a circular detection barrier with a diameter of ½ mile. Alternatively, each dual sensor motion detectors 200A, 200B, 200C, and 200D may monitor a specific area of the property to provide complete coverage of non-uniform properties.

The placement of the dual sensor motion detector 200A, 200B, 200C, and 200D at a far distance provides the user with sufficient notice of an approaching object. Placing the dual sensor motion detector 200A, 200B, 200C, and 200D in a driveway provides ample notice of visitors entering the property. Placing the dual sensor motion detector 200A, 200B, 200C, and 200D in a field provides notice that wildlife has entered your land. Placing the dual sensor motion detector 200A, 200B, 200C, and 200D in a warehouse alerts a user of potential trespassers during closing hours. By utilizing an appropriate number of dual sensor motion detectors 200A, 200B, 200C, and 200D with receivers 100A, 100B, and 100C, the motion detection system 10 can provide motion detection for large areas not previously capable of being adequately monitored by existing systems.

Figure 2:
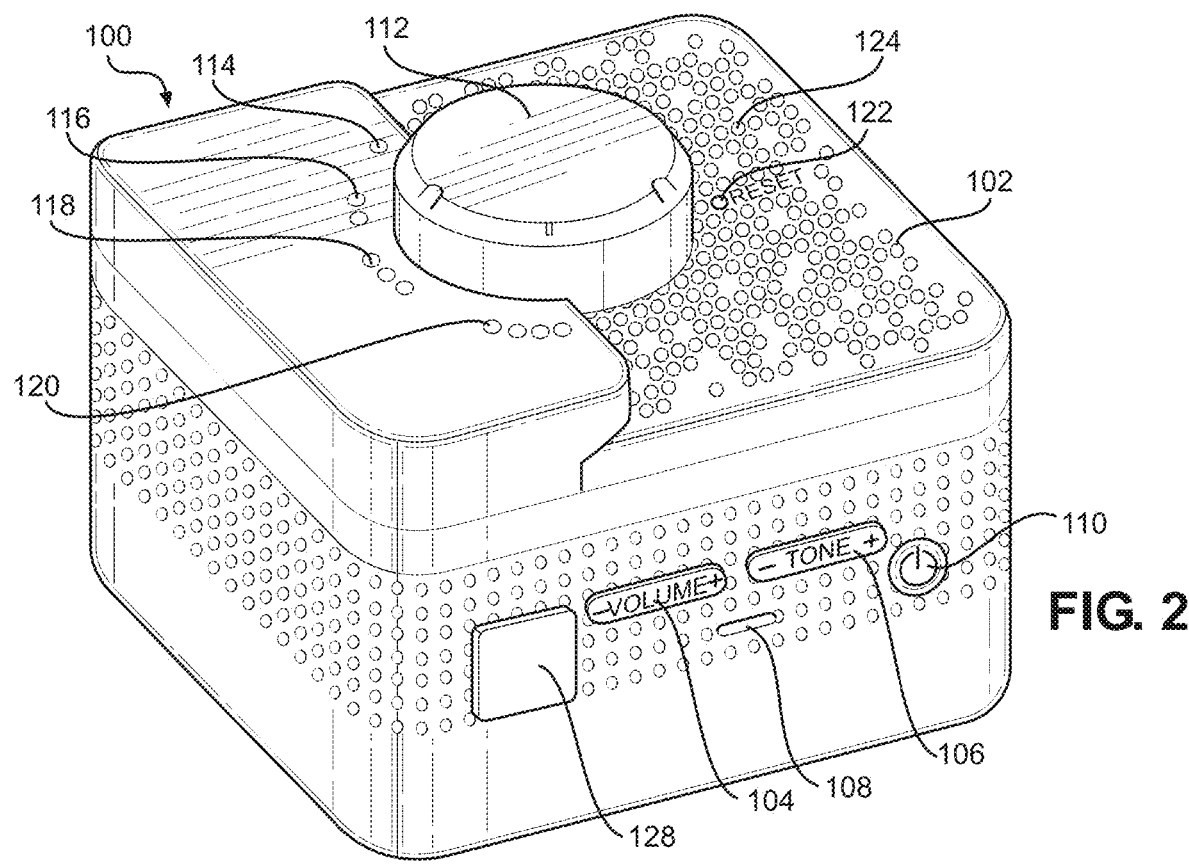
FIG. 2 is a perspective view of a receiver of the motion detection system with dual sensor motion detectors.

Referring now to FIG. 2, a perspective view of a receiver is shown and generally designated 100. Receiver 100 is the same as receivers 100A, 100B, and 100C; for clarity, only receiver 100 will be used to describe the receiver of the present invention. Receiver 100 includes a body 102 in the shape of a cube having six sides. On the front of the body 102 is a volume toggle 104 that controls the volume of the receiver 100. The front of the receiver 100 also has tone toggle 106 that controls the selection of tone used to alert a user of a triggered motion sensor. The front of the receiver 100 further includes a USB port 108 that enables the connection of a USB wire to the receiver 100 to charge the internal batteries and/or power the receiver 100, among other functions. A power button 110 is also located on the front of the receiver 100. A control port 128 is also located in the front of the receiver 100 and is shown with a cover enclosing the control port 128.

The top of the receiver 100 includes a control wheel 112, a Zone 1 LED indicator 114, a Zone 2 LED indicator 116, a Zone 3 LED indicator 118, a Zone 4 LED indicator 120, and a reset LED indicator 122. A speaker vent 124 for a speaker 126 (not shown) is also located at the top of the receiver 100. The control wheel 112 switches between the various different control zones of the receiver 100 by turning the control wheel 112 to the appropriate Zone LED indicator. As shown, the control wheel 112 is currently pointed at the Zone 3 LED indicators indicating that Zone 3 is currently being programmed. With the control wheel 112 at Zone 3 the volume of the alert and tone may be changed. This enables separate audible indications when movement is detected in a particular zone. Additionally, multiple motion detectors may be assigned to a particular zone with a particular volume and tone set for each individual motion detector.

Figure 3:
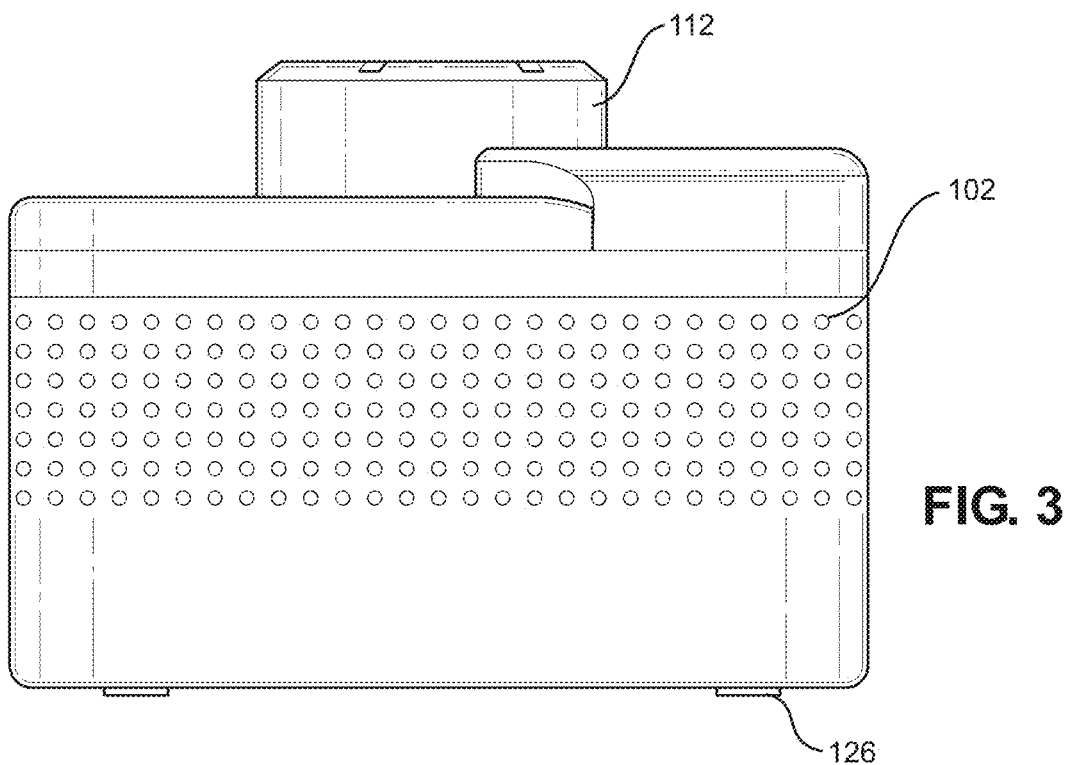
FIG. 3 is a side view of the receiver.

Referring now to FIG. 3, a side view of the receiver 100 is shown. As shown, the control wheel 112 protrudes from the surface of the body 102. This allows for better control of the control wheel 112. Located on the bottom of the receiver 100 is a plurality of rubber feet 126. This elevates the receiver 100 from a surface and provides grip to the surface so that the receiver 100 is not easily displaced from its position.

Figure 4:
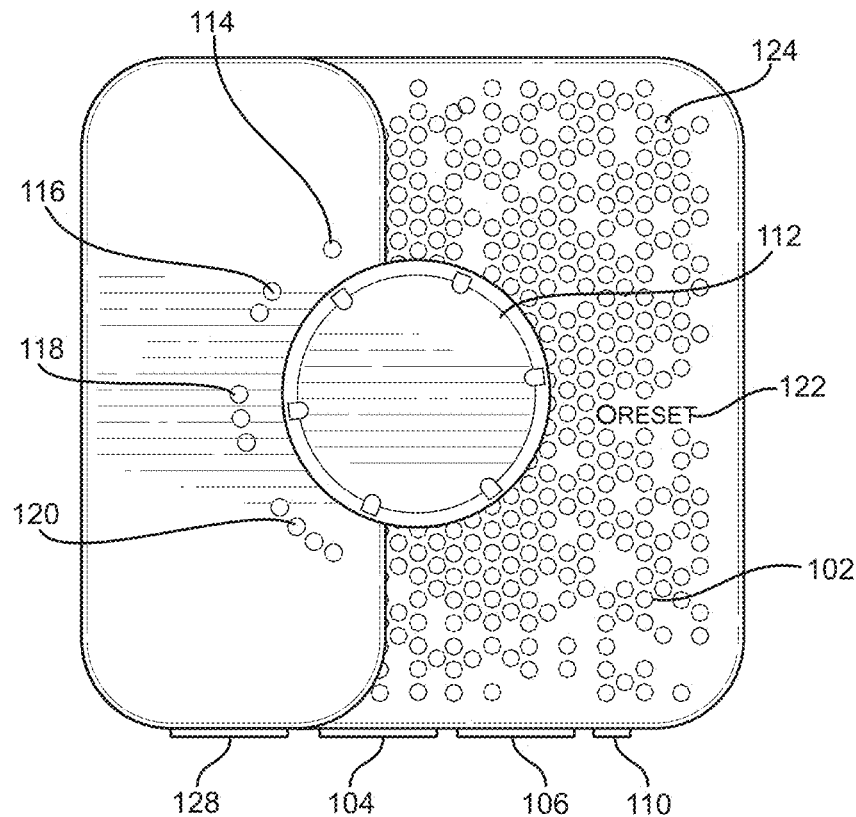
FIG. 4 is a top view of the receiver.

Referring now to FIG. 4, a top view of the receiver 100 is shown. The top of the receiver 100 includes the control wheel 112, the Zone 1 LED indicator 114, the Zone 2 LED indicator 116, the Zone 3 LED indication 118, the Zone 4 LED indicator 120, and the reset LED indicator 122. The speaker vent 124 for the speaker 126 (not shown) is also located at the top of the receiver 100. Protruding from the side of the receiver 100 are the volume toggle 104, the tone toggle 106, the power button 110, and the control port 128 with cover.

Figure 5:
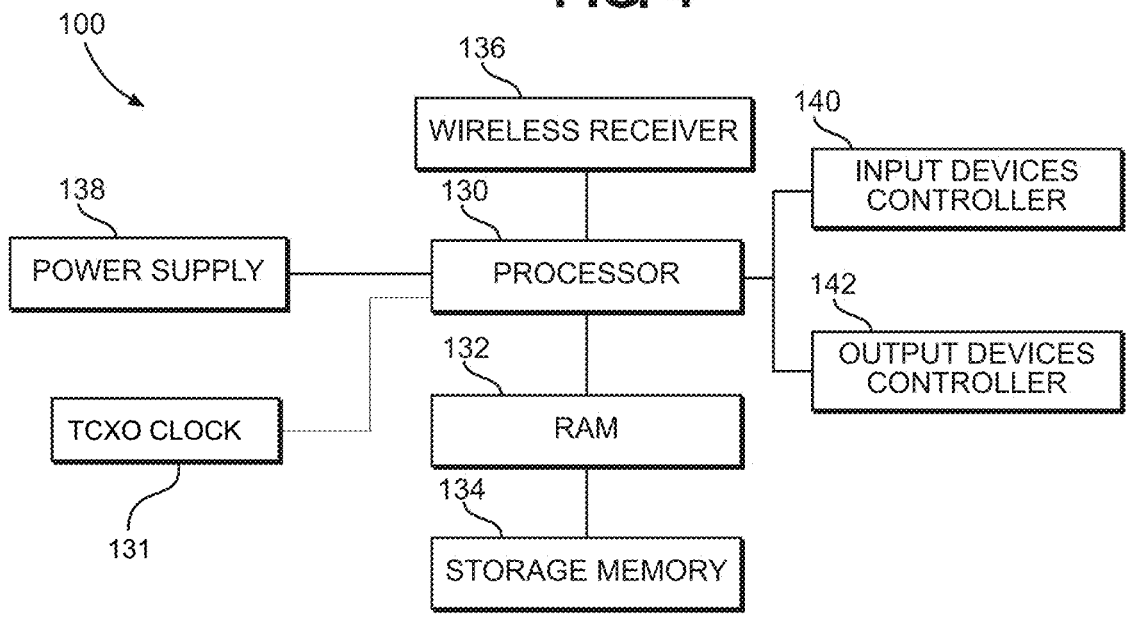
FIG. 5 is a diagram of the electronic components of the receiver.

Referring now to FIG. 5, a diagram of the electronic components of the receiver 100 is shown. The receiver 100 includes a processor 130, a RAM 132, a storage memory 134, a wireless receiver 136, a power supply 138, an input devices controller 140, and an output devices controller 142. The processor 130 controls the main functions of the receiver 100 with the RAM 132 providing the memory utilized by the processor 130 and various other electronic components to function. Storage memory 134 provides the memory to store settings and other long-term data. A TCXO clock 131, or temperature compensated crystal oscillator clock, is in communication with the processor 130 and provides the internal clock for the receiver 100. The TCXO clock 131 provides ultra-low tolerances of 0.5 ppm. Additionally, by using the TCXO clock 131, the operating frequency of the receiver 100 is not going to shift due to changes in temperature. The TCXO clock 131 provides for more precise frequency control resulting in lower bit error rate.

The wireless receiver 136 is configured to receive signals from the dual sensor motion detectors 200A, 200B, 200C, and 200D. The input devices controller 140, which may be a single component or multiple components, is configured to receive the inputs of the receiver 100, such as the volume toggle 104, the tone toggle 106, USB port 108, power button 110, control wheel 112, and control port 128. The output devices controller 142, which may be a single component or multiple components, is configured to transmit the outputs of the receiver 100 to various components of the receiver 100, such as the various LED lights and speaker 126.

It is contemplated that in an alternative embodiment of the invention of the receiver 100, the receiver 100 may include the capability to be connected by wireless communications to existing user networks, such as alarm systems, home wireless networks, connected home automation devices, or any other connected networks and devices. By connecting the receiver 100 to an existing home alarm system, the motion detection system 10 can be utilized as an additional sensor that monitors the exterior of the home for intruders. Typical home alarm system cannot be installed to monitor the exterior property of the homes due to their construction and lack of range, whereas the dual sensor motion detectors 200A, 200B, 200C, and 200D are housed in weatherproof chassis, made to work in all environments, and have communication ranges far surpassing typical home alarm systems.

By connecting the receiver 100 to a home network with Internet access, the receiver 100 may connect with various devices connected to the home network and to devices connected over the internet. With the dual sensor motion detectors 200A, 200B, 200C, and 200D located around the exterior perimeter of the property that the house is on, the receiver 100 may turn on the exterior lights of the house connected to the home network when movement is detected on the property to guide welcomed guests or deter unwelcomed guests. By being connected to the internet through the home network, the receiver 100 may send alerts directly to users that may not be at home. The receiver 100 may send alerts to a computer, a mobile phone, or other portable devices by sending an SMS, MMS, or e-mail over the internet to alert of detected object movement.

In addition, the motion detection system 10 may include proprietary software capable of communication with the receiver 100 through a wireless connection, such as over a Wi-Fi connection or an internet connection. The proprietary software will provide the capability of monitoring the connected dual sensor motion detectors, past alerts, present alerts, settings, and various other capabilities. The proprietary software can also receive communications from the receiver 100, such as motion detection alerts, low-battery alarms, and malfunctioning motion detectors.

Figure 6:
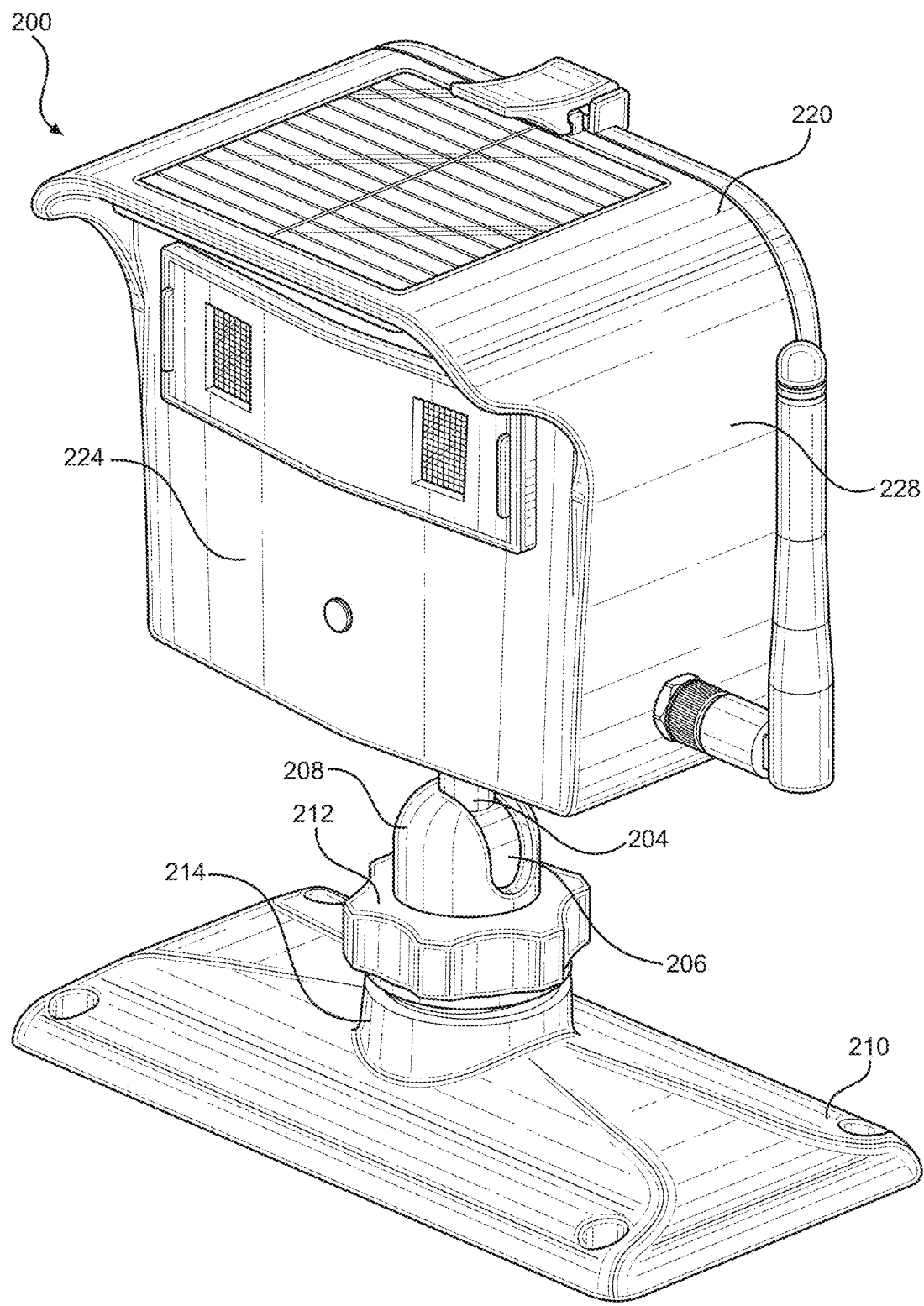
FIG. 6 is a front perspective view of a dual sensor motion detector of the motion detection system with dual sensor motion detectors.
Figure 7:
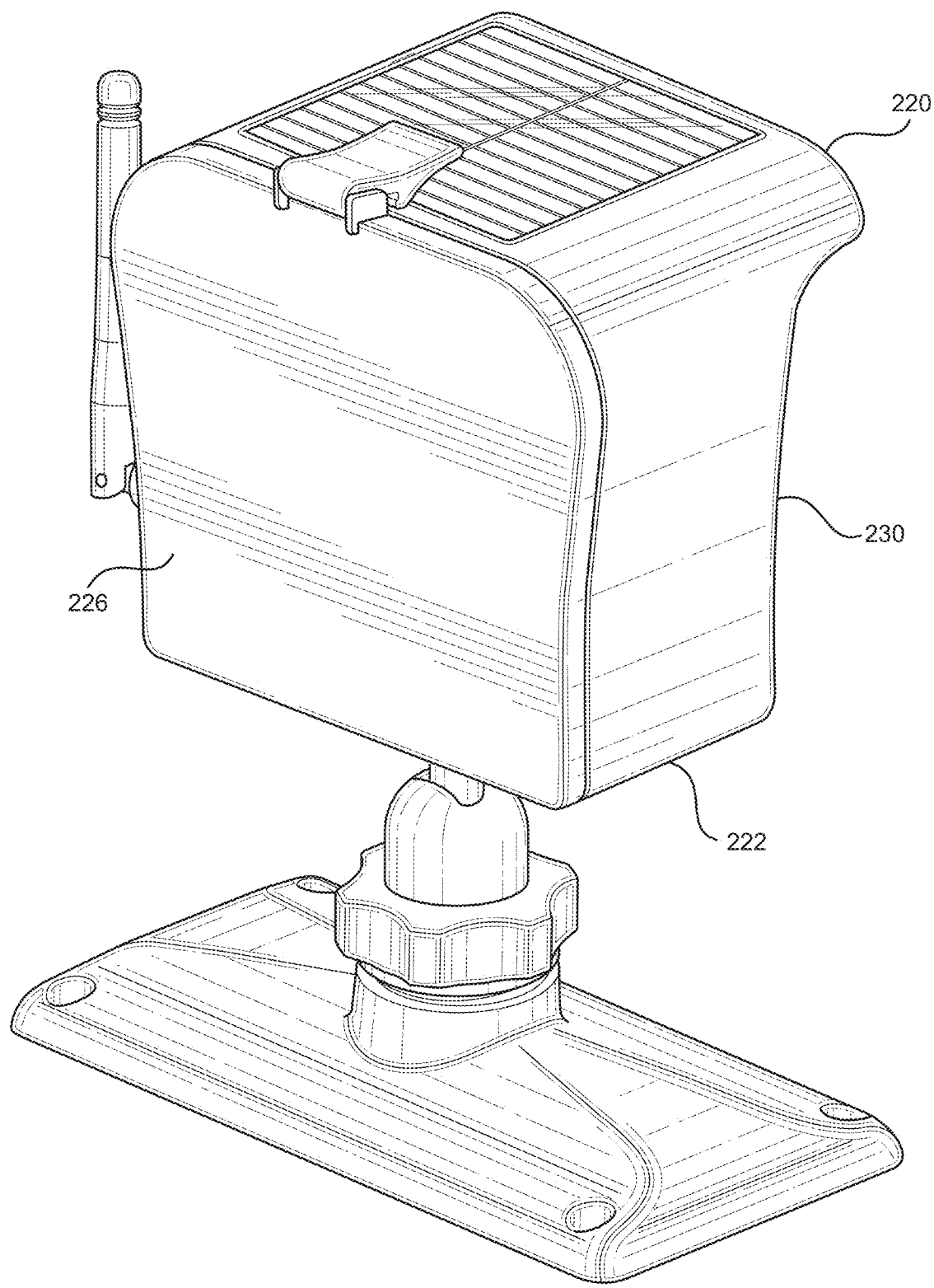
FIG. 7 is a back perspective view of the dual sensor motion detector.
Figure 14:
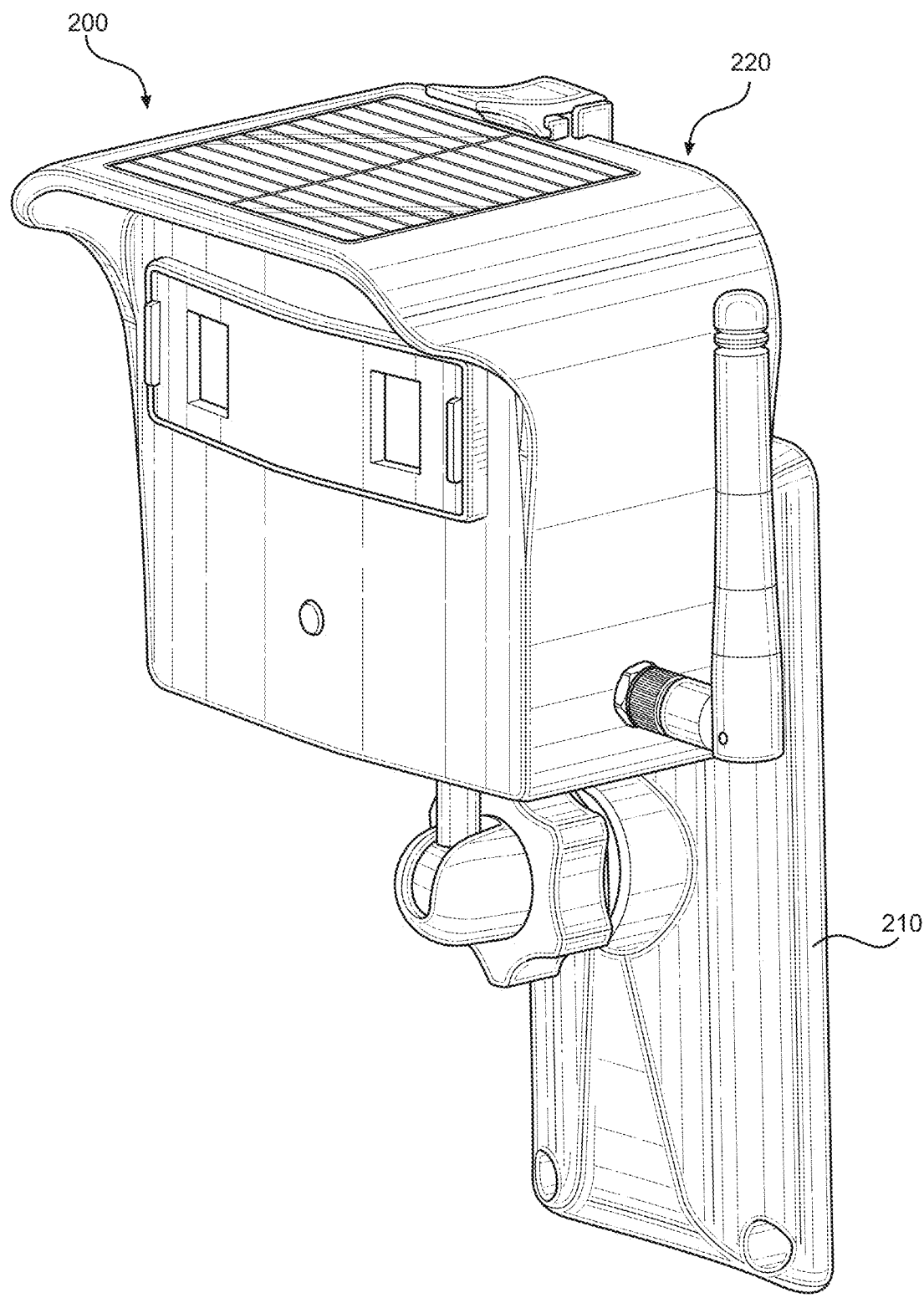
FIG. 14 is a front perspective view of the dual sensor motion detector in an alternative position.

Referring now to FIG. 6, a front perspective view of the dual sensor motion detector 200 is shown. Dual sensor motion detector 200 is the same as dual sensor motion detectors 200A, 200B, 200C, and 200D; for clarity, only dual sensor motion detector 200 will be used to describe the dual sensor motion detectors of the present invention. Dual sensor motion detector 200 includes a dual sensor chassis 202 movably attached to articulable seat 210. The dual sensor chassis 202, described in conjunction with FIG. 7, includes a top 220, a bottom 222, a front 224, a back 226, a right side 228, and a left side 230. The dual sensor chassis 202 includes an arm 204 attached to the dual sensor chassis 202 and a ball 206 attached to the arm 204 at the opposite end. The ball 206 is inserted into a socket 208 which is connected to a threaded stem 214 formed into the articulable seat 210 with a nut 212. The ball 206 and socket 208 allows the dual sensor chassis 202 and the seat 210 to articulate relative to each other. This provides the dual sensor chassis 202 to be articulated to achieve the desired position regardless of the mounting position of the seat 210. As shown in FIG. 14, the seat 210 is rotated 90 degrees and tilted 90 degrees to enable the dual sensor motion detector 200 to be mounted to a wall.

Figure 8:
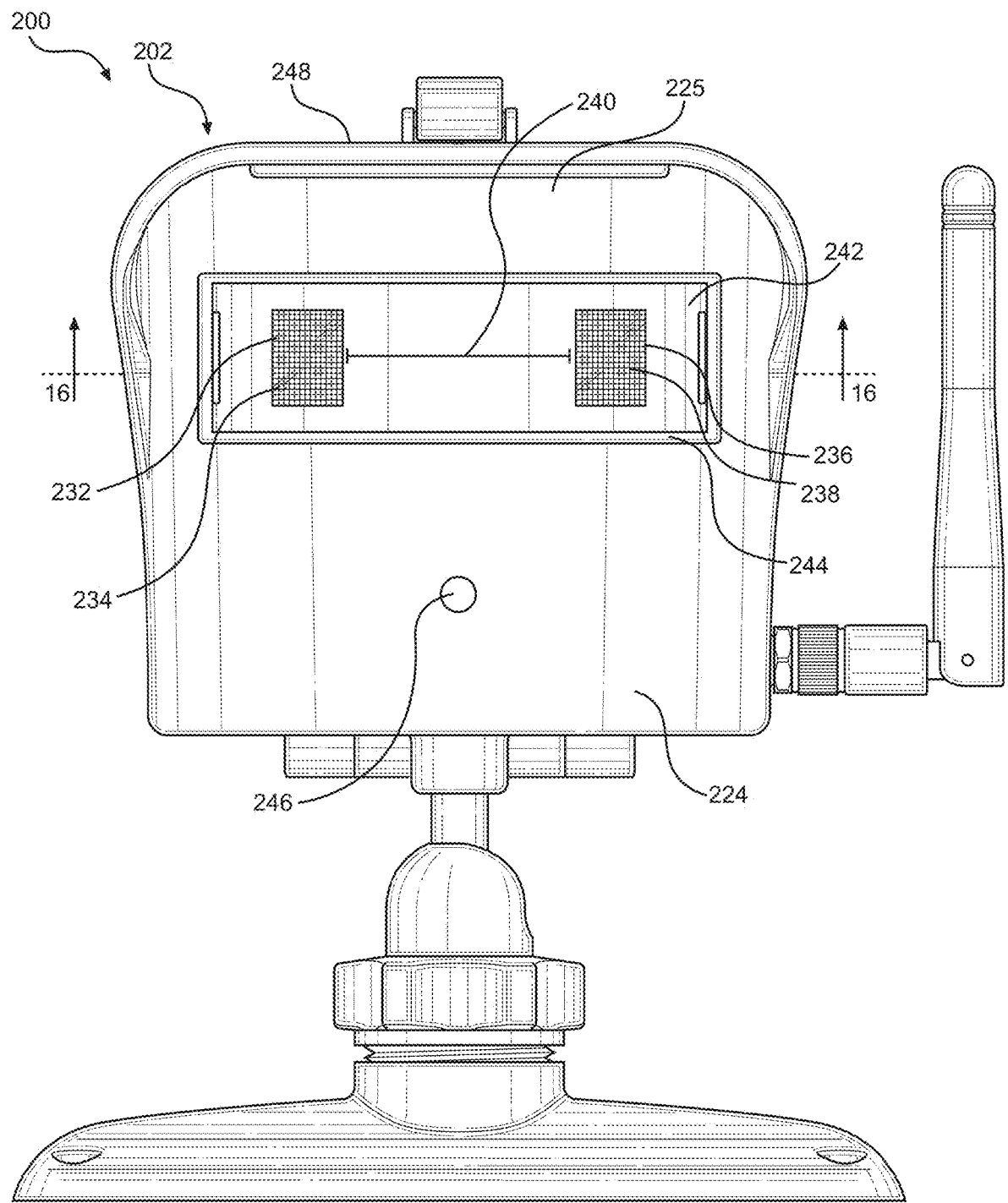
FIG. 8 is a front view of the dual sensor motion detector.

Referring now to FIG. 8, a front view of the dual sensor motion detector 200 is shown. The front 224 is formed with a centerline curvature 225, splitting the front 224 into two halves with each half at a curvature angle 227 (shown in FIG. 16) from the centerline curvature 225. In the preferred embodiment of the dual sensor motion detector 200, the curvature angle 227 is 5 degrees. It is contemplated that the curvature angle 227 may vary depending on the specifications of the dual sensor motion detector 200. A first sensor window 232 is formed into the left half of the front 224 and a second sensor window 236 is formed into the right half of the front 224 at a sensor window distance 240 apart. A first sensor 234 is adjacent to and exposed through the first sensor window 232 and a second sensor 238 is adjacent to and exposed through the second window 236. The first sensor 234 and the second sensor 238 are also rotated at the curvature angle 227 from the centerline.

A field of view adjustment barrier 242 is attached to a field of view adjustment barrier mount 244 that is formed into the front 224 of the dual sensor chassis 202. The field of view adjustment barrier mount 244 encloses the first sensor window 232 and the second sensor window 236 to allow the placement of the field of view adjustment barrier 242 over the first sensor window 232 and the second sensor window 236. The field of adjustment barrier 242 includes two windows positioned to be aligned with the first sensor window 232 and the second sensor window 236. The two windows in the field of view adjustment barrier 242 have a narrower opening than the first sensor window 232 and the second sensor window 236 in order to focus the field of view of the first sensor 234 and the second sensor 238. Removal of the field of view adjustment barrier 242 provides the first sensor 234 and the second sensor 238 with its full field of view.

The front 224 of the dual sensor chassis 202 also includes a status indicator light 246. The status indicator light 246 indicates that the dual sensor motion detector is active, being programmed, malfunctioning, or for any predetermined purpose. A hood 248 is formed into the top 220 and front 224 of the dual sensor chassis 202 and extends past the front 224 to provide shade for the first sensor 234 and the second sensor 238.

Figure 9:
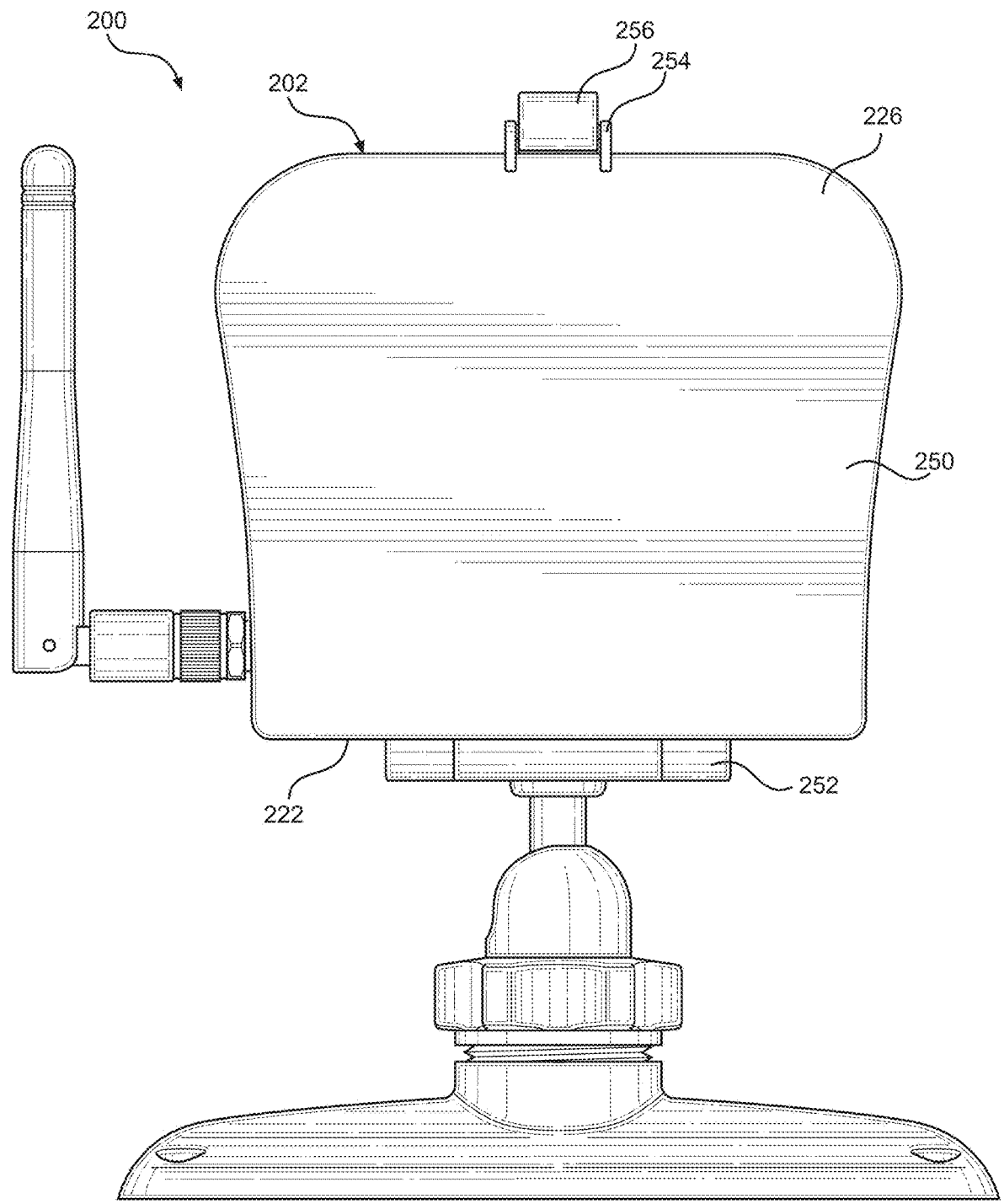
FIG. 9 is a back view of the dual sensor motion detector.

Referring now to FIG. 9, a back view of the dual sensor motion detector 200 is shown. Attached to the back 226 of the dual sensor chassis 202 is a battery cover 250. The battery cover 250 includes a battery cover hinge 252 at the bottom and a clasp hinge 254 with attached clasp 256 at the top. The battery cover hinge 252 is attached to the bottom 222 of the dual sensor chassis 202 and allows for the rotation of the battery cover 250. A clasp retainer 258 is formed at the top 220 of the dual sensor chassis 202 and allows the clasp 256 to be retained by the clasp retainer 258 to secure the battery cover 250 in place.

Figure 10:
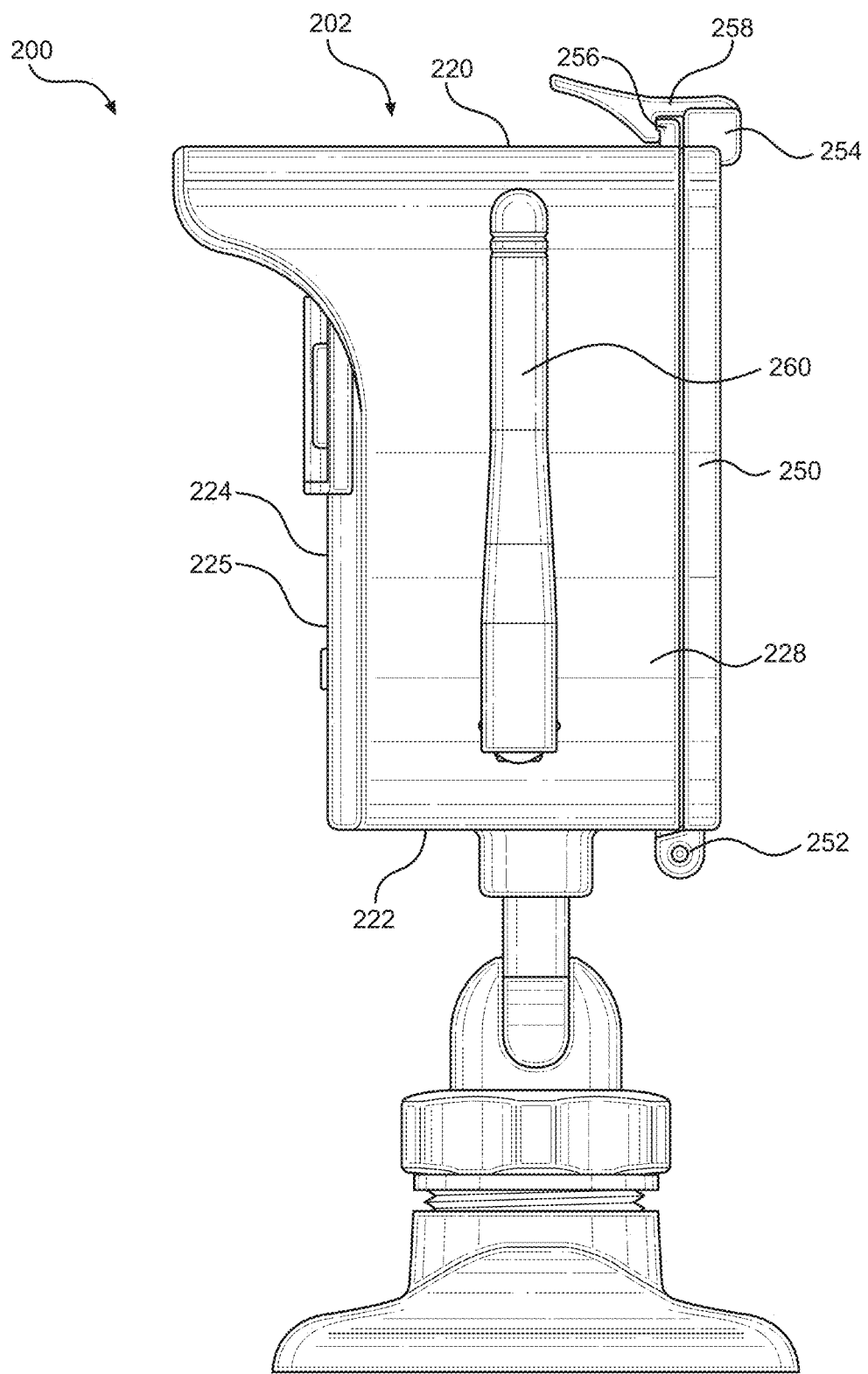
FIG. 10 is a right side view of the dual sensor motion detector.

Referring now to FIG. 10, a right side view of the dual sensor motion detector 200 is shown. On the right side 228 of the dual sensor chassis 202 is an antenna 260. The antenna 260 is removably attached to the dual sensor chassis 202 and is rotatable and articulable relative to its attachment point. The antenna 260 transmits data between the dual sensor motion detector 200 and the receiver 100. The hood 248 is integrally formed with the top 220 and the right side 228 of the dual sensor chassis 202 and extends past the front 224 of the dual sensor chassis 202. The centerline curvature 225 extends beyond the right side 228 and left side 230 of the dual sensor chassis 202 and the right side and left side of the front 224 terminates at the right side 228 and left side 230, respectively.

The battery cover 250 is attached to the bottom 222 of the dual sensor chassis 202 with the hinge 252. At the top 220 of the dual sensor chassis 202, the clasp retainer 258 is formed. The clasp retainer 258 retains the clasp 256. The batter cover 250 rotates about the hinge 252 and the clasp 256 rotates about the clasp hinge 254. The battery cover 250 can rotate away from the dual sensor chassis 202 when access to the interior of the dual sensor chassis 202 is needed and the clasp 258 keeps the battery cover 250 closed when access is not needed.

Figure 11:
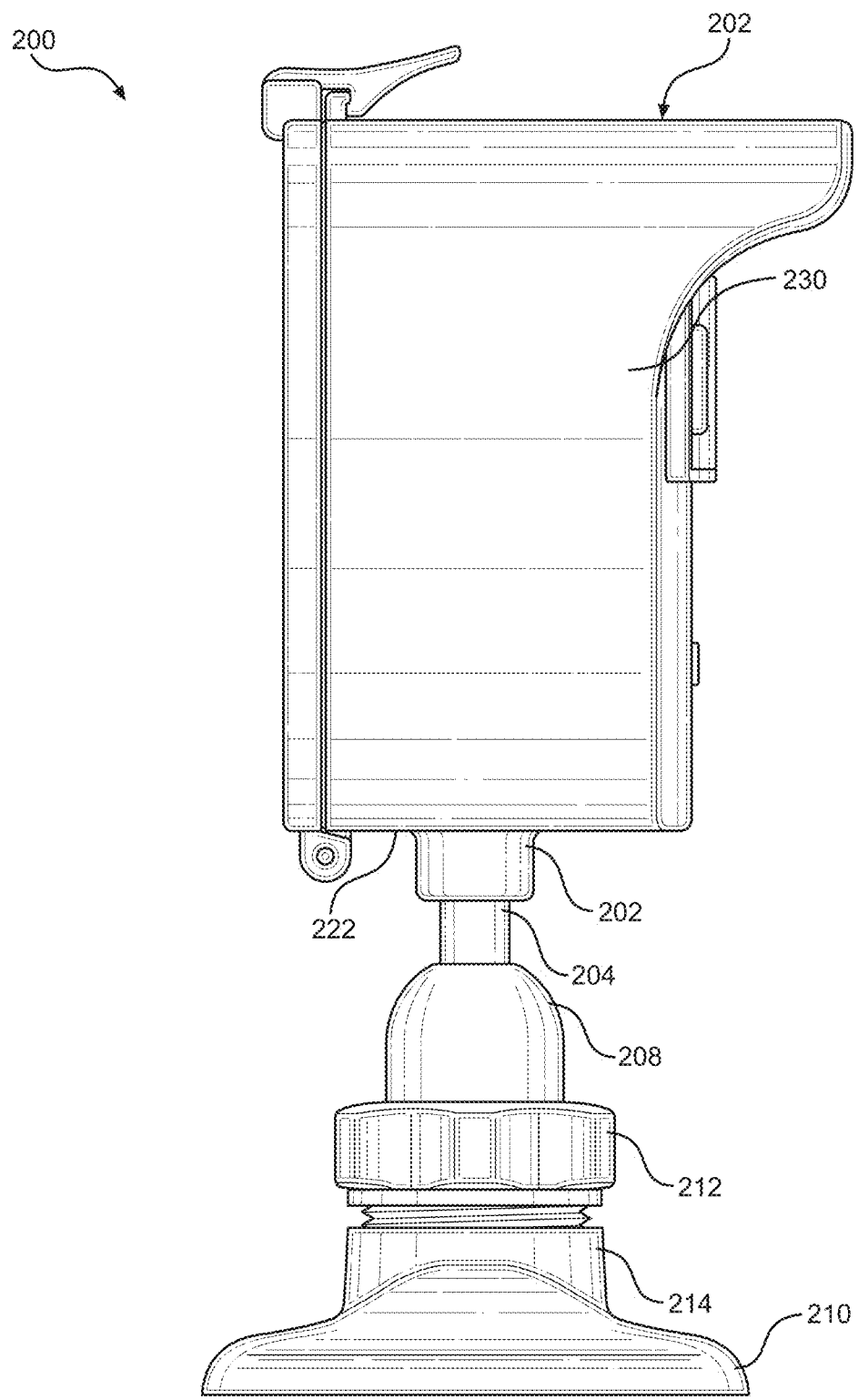
FIG. 11 is a left side view of the dual sensor motion detector.

Referring now to FIG. 11, a left side view of the dual sensor motion detector 200 is shown. The dual sensor chassis 202 includes the arm 204 attached to an arm mount 262 formed in the bottom 222 of the dual sensor chassis 202. The ball 206, attached to the arm 204 at the opposite end, is inserted into the socket 208 which is connected to the threaded stem 214 formed into the articulable seat 210 with the nut 212. The ball 206 and the socket 208 allows the dual sensor chassis 202 and the seat 210 to articulate relative to each other.

Figure 12:
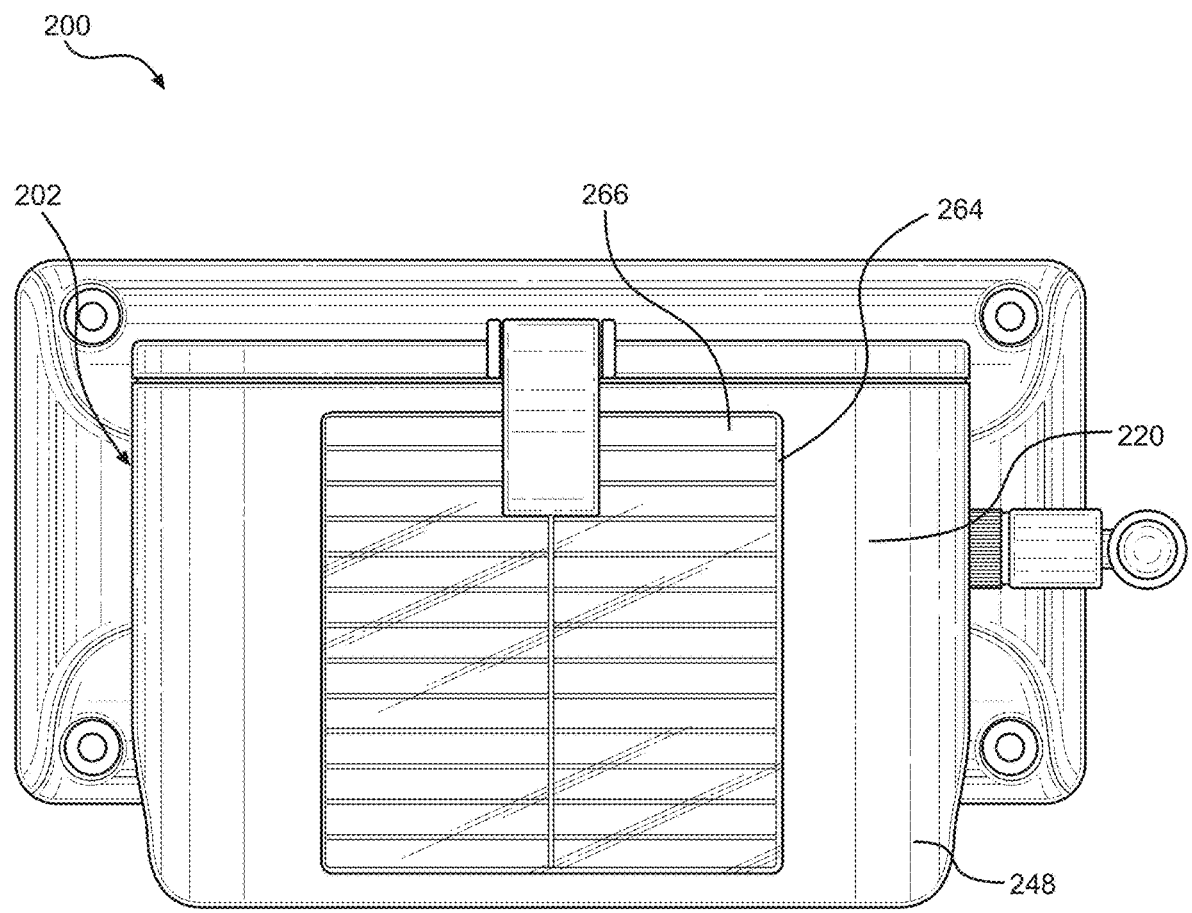
FIG. 12 is a top view of the dual sensor motion detector.

Referring now to FIG. 12, a top view of the dual sensor motion detector 200 is shown. The top 220 of the dual sensor chassis 202 includes the hood 248, which extends past the front 224 of the dual sensor chassis 202. Formed into the hood 248 is a photovoltaic cell retainer 264. A photovoltaic cell 266 is placed within and retained in the photovoltaic cell retainer 264. The photovoltaic cell 266 is connected to the power supply of the dual sensor motion detector 200 to help charge the power supply to extend the use of the dual sensor motion detector 200.

Figure 13:
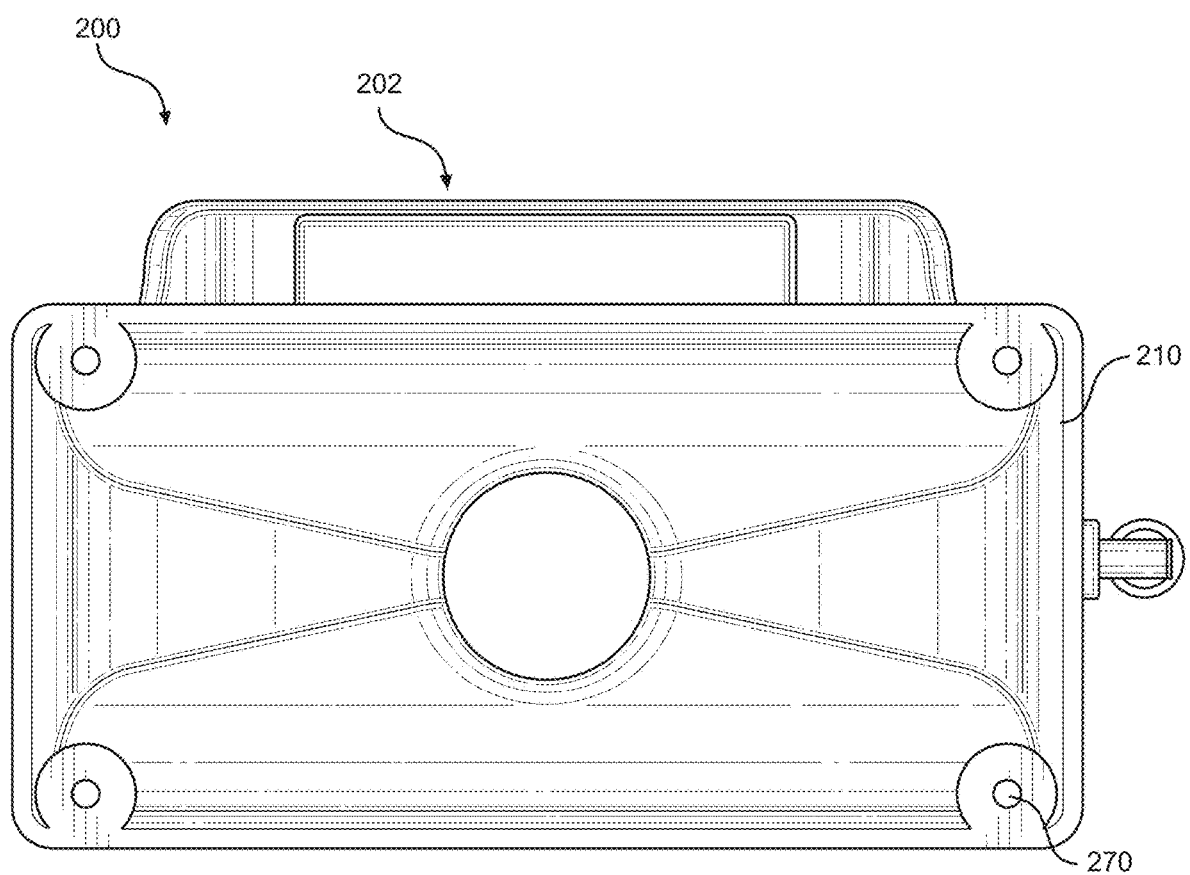
FIG. 13 is a bottom view of the dual sensor motion detector.

Referring now to FIG. 13, a bottom view of the dual sensor motion detector 200 is shown. The seat 210 has a rectangular shape and includes a mounting hole 270 at each corner of the seat. The mounting holes 270 aids in mounting the dual sensor motion detector 200 in the appropriate location.

Referring now to FIG. 14, a front perspective view of the dual sensor motion detector 200 with the seat 210 articulated in relation to the dual sensor chassis 202 is shown. The seat 210 is rotated 90 degrees and tilted 90 degrees to enable the dual sensor motion detector 200 to be mounted to a wall.

Figure 15:
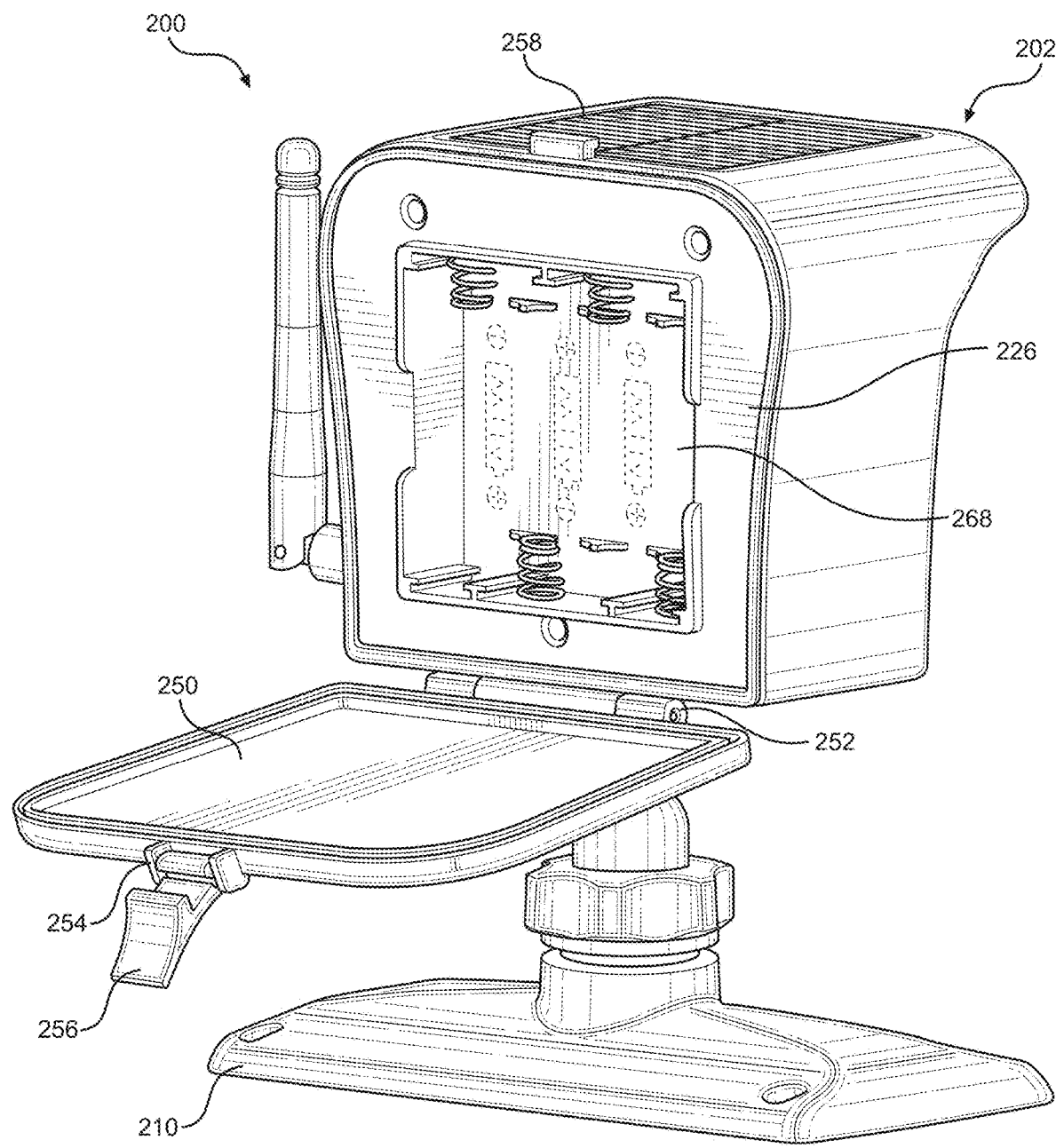
FIG. 15 is a back perspective view of the dual sensor motion detector in yet an alternative position.

Referring now to FIG. 15, a rear perspective view of the dual sensor motion detector 200 with the battery cover 250 open is shown. The battery cover 250 rotates about the hinge 252 and the clasp 256 rotates about the clasp hinge 254. The battery cover 250 is rotated away from the back 226 of the dual sensor chassis 202 providing access to a battery compartment 268 of the dual sensor chassis 202. When access to the battery compartment 268 is not needed, the battery cover 250 can be rotated towards the back 226 of the dual sensor chassis 202 and the clasp 258 is rotated and retained by the clasp retainer 258 keeping the battery cover 250 closed.

Figure 16:
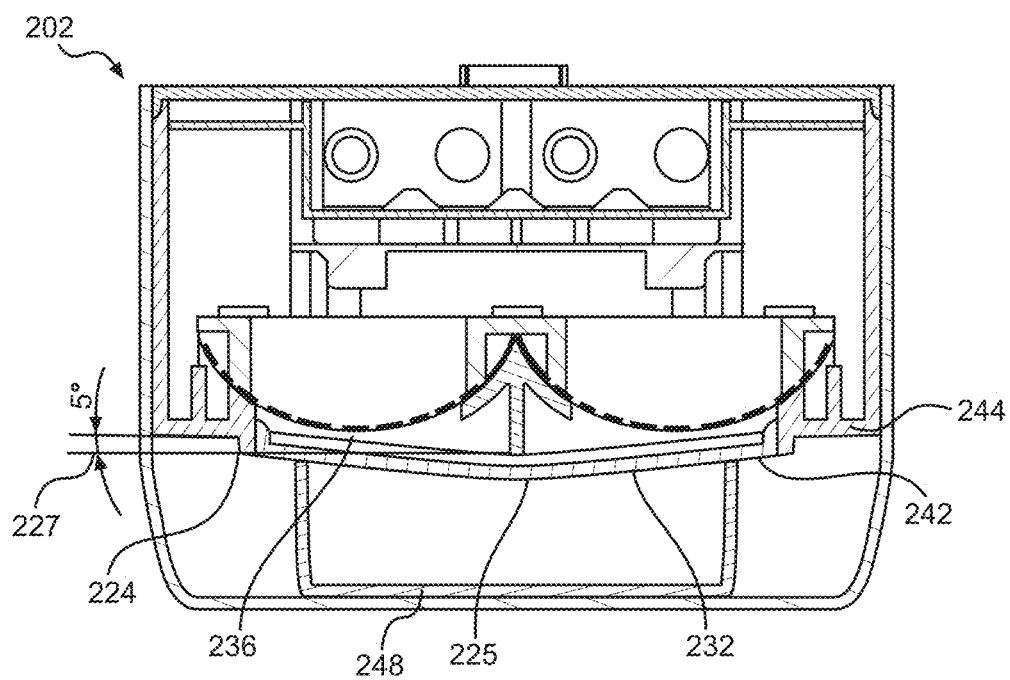
FIG. 16 is a cross section view of the dual sensor motion detector.

Referring now to FIG. 16, a cross section view of the dual sensor chassis 202 taken along line 16-16 of FIG. 8 is shown with the internal components of the dual sensor motion detector 200 not shown to show details of the dual sensor chassis 202. The front 224 is formed with the centerline curvature 225, splitting the front 224 into two halves with each half at a curvature angle 227 from the centerline curvature 225. In the preferred embodiment of the dual sensor motion detector 200, the curvature angle 227 is 5 degrees. It is contemplated that the curvature angle 227 may vary depending on the specifications of the dual sensor motion detector 200. The first sensor window 232 is formed into the left half of the front 224 and the second sensor window 236 is formed into the right half of the front 224 at a sensor window distance 240 apart. The field of view adjustment barrier 242 is attached to a field of view adjustment barrier mount 244 that is formed into the front 224 of the dual sensor chassis 202.

The field of view adjustment barrier mount 244 encloses the first sensor window 232 and the second sensor window 236 to allow the placement of the field of view adjustment barrier 242 over the first sensor window 232 and the second sensor window 236. The field of adjustment barrier 242 includes two windows positioned to be aligned with the first sensor window 232 and the second sensor window 236. The two windows in the field of view adjustment barrier 242 have a narrower opening than the first sensor window 232 and the second sensor window 236 in order to focus the field of view of the first sensor 234 and the second sensor 238. Removal of the field of view adjustment barrier 242 provides the first sensor 234 and the second sensor 238 with its full field of view. The hood 248 extends past the front 224 of the dual sensor chassis 202.

Figure 17:
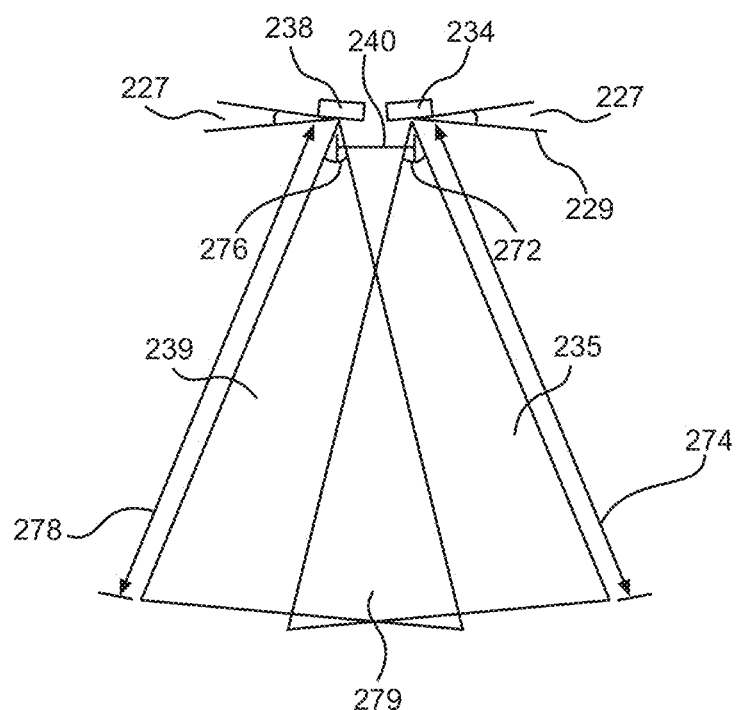
FIG. 17 is a plan view diagram of a first sensor and a second sensor of the dual sensor motion detector.

Referring now to FIG. 17, a plan view diagram of the first sensor 234 and the second sensor 238 in the dual sensor motion detector 200 is shown. The first sensor 234 is positioned at the curvature angle 227 from a plane 229 tangent to and parallel with the centerline curvature 225 (not shown in the figure) and the second sensor 238 is also positioned at the curvature angle 227 from the plane 229 at sensor window distance 240 apart.

The first sensor 234 has a viewing angle 272 and a viewing distance 274. The viewing angle 272 and the viewing distance 274 of the first sensor 234 provide the first sensor 234 with a first sensor coverage area 235. The second sensor 238 has a viewing angle 276 and a viewing distance 278. The viewing angle 276 and the viewing distance 278 of the second sensor 238 provide the second sensor 238 with a second sensor coverage area 239. The positioning of the first sensor 234 and the second sensor 238 overlaps the first sensor coverage area 235 and the second sensor coverage area 239 and provides a dual sensor coverage area 279, where both the first sensor 234 and the second sensor 238 monitors.

The first sensor coverage area 235 and the second sensor coverage area 239 may be modified for specific uses. The viewing angle 272 and the viewing distance 274 of the first sensor 234 may be individually or concurrently changed to change the first sensor coverage area 235. The viewing angle 276 and the viewing distance 278 of the second sensor 238 may be individually or concurrently changed to change the second sensor coverage area 239. In the preferred embodiment, the viewing distance 274 and 278 may be electronically modified by adjusting the settings of the first sensor 234 and the second sensor 238. The maximum viewing angle of the first sensor 234 and the second sensor 238 is physically set, however, with the use of the field of view adjustment barrier 242 the viewing angle 272 and 276 may be adjusted by a user.

The field of adjustment barrier 242 includes two windows positioned to be aligned with the first sensor window 232 and the second sensor window 236. The two windows in the field of view adjustment barrier 242 have a narrower opening than the first sensor window 232 and the second sensor window 236 in order to focus the field of view of the first sensor 234 and the second sensor 238. The field of view adjustment barrier 242 is made of a material that is impenetrable by the first sensor 234 and the second sensor 238, thereby allowing the sensor to view only through the windows. Removal of the field of view adjustment barrier 242 provides the first sensor 234 and the second sensor 238 with its full field of view.

Figure 18:
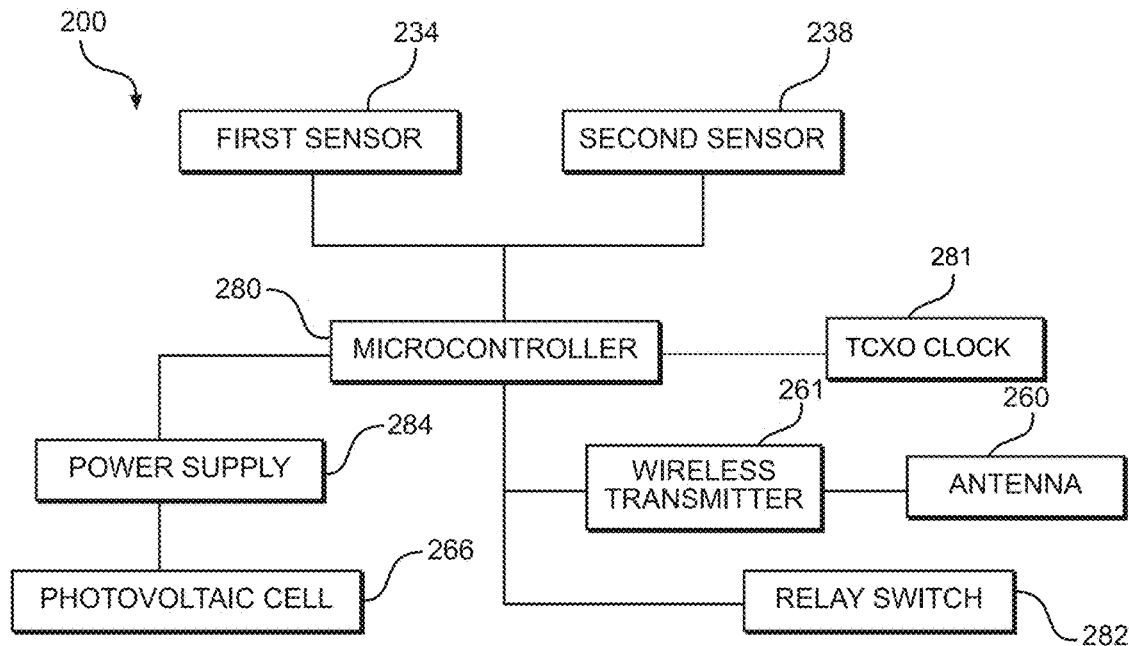
FIG. 18 is a diagram of the electronic components of the dual sensor motion detector.

Referring now to FIG. 18, a diagram of the electronic components of the dual sensor motion detector 200 is shown. The dual sensor motion detector 200 includes a microcontroller 280 in communication with the first sensor 234 and the second sensor 238. A TCXO clock 281, or temperature compensated crystal oscillator clock, is in communication with the microcontroller 280 and provides the internal clock for the dual sensor motion detector 200. The TCXO clock 281 provides ultra-low tolerances of 0.5 ppm. Additionally, by using the TCXO clock 281, the operating frequency of the dual sensor motion detector 200 is not going to shift due to changes in temperature. The TCXO clock 281 provides for more precise frequency control resulting in lower bit error rate.

The microcontroller 280 is also in communication with the transmitter 261 to transmit data through the antenna 260 to the receiver 100. In an embodiment, the antenna 260 is a 915 MHz antenna. The antenna 260 is matched with the wireless receiver 136, which includes a 915 MHz antenna, at the center frequency down to −20 dB. At −10 db, the bandwidth is +/−5 MHz from the center frequency. The antenna 260 has a 3 dBi gain and the wireless receiver 136 has a 2 dBi gain. The transmitter 261 is configured to communicate with the wireless receiver 136 of the receiver 100. The microcontroller 280 is also in communication with a relay switch 282, which may be utilized to control another component in the motion detection system 10. Powering the dual sensor motion detector 200 is the power supply 284. The photovoltaic cell 266 provides supplementary power to the power supply 284 to trickle charge and extend its use. The power supply 284 may be batteries or a transformer connected to a power outlet. It is contemplated that in an alternative embodiment of the dual sensor motion detector 200, the dual sensor motion detector 200 may include a camera capable of taking video or photographs.

The dual sensor motion detector 200 is programmed to reduce the data rate of the dual sensor motion detector 200 down to 4,000 bps (bytes per second). By reducing the data rate of the dual sensor motion detector 200, the communication range between the dual sensor motion detector 200 and the receiver 100 is greatly increased. Moreover, the dual sensor motion detector 200 is programmed to send 64 bytes of data when it is being triggered, thus the low data rate does not affect the operation of the system 10. The dual sensor motion detector 200, utilizing the transmitter 261 in conjunction with the antenna 260 and internal programming, is able to communicate with the receiver 100 up to a ¼ mile away, which provides the dual sensor motion detector 200 with a detection range of a ¼ mile. By utilizing an appropriate number of dual sensor motion detectors 200 with the receiver 100 located at the center of the dual sensor motion detectors 200, the motion detection system 10 can provide a detection perimeter of ½ mile. The dual sensor motion detector 200, with its long range communications capability with the receiver 100, provides the user with an alert whenever an object passes through the detection perimeter. The placement of the dual sensor motion detector 200 at a far distance provides the user with sufficient warning of an incoming person or car, providing enough time to finish up a task, get to the front door, or remove the element of surprise.

Figure 19:
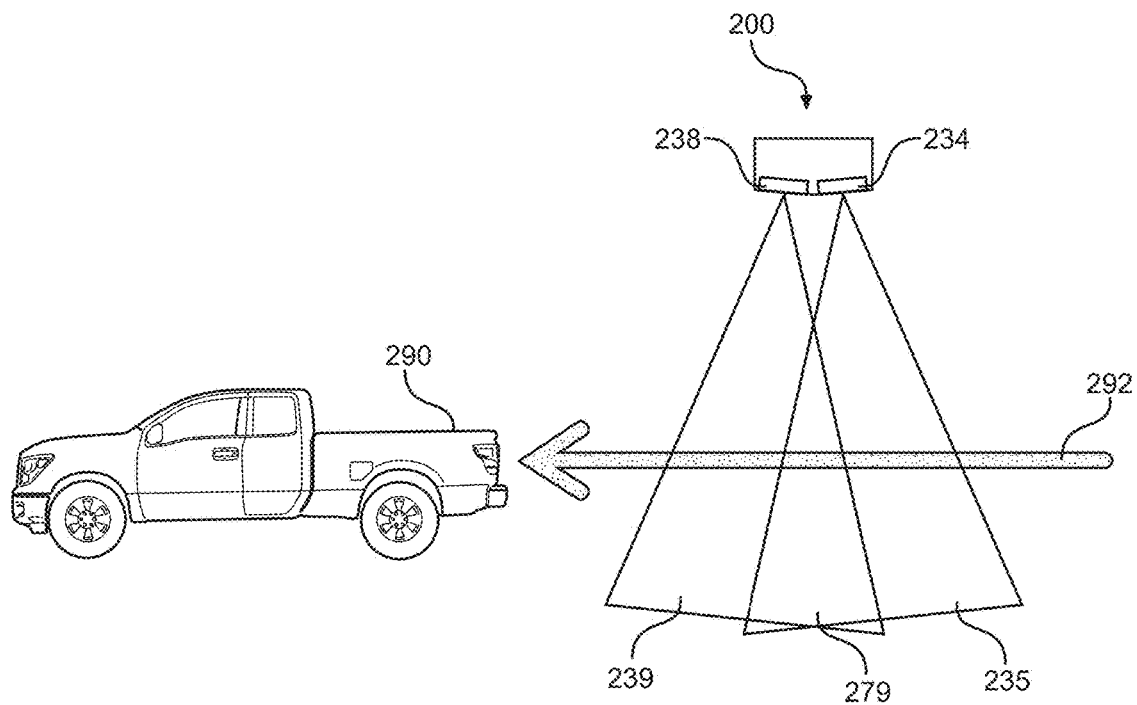
FIG. 19 is a plan view diagram of a first sensor and a second sensor of the dual sensor motion detector with an object passing by the dual sensor motion detector.

Referring now to FIG. 19, a plan view diagram of the first sensor 234 and the second sensor 238 in the dual sensor motion detector 200 is shown. In the preferred embodiment of the present invention, the first sensor 234 and the second sensor 238 are passive infrared sensors. As shown an object 290 moves across the dual sensor motion detector 200 is direction 292. Generally, the object 290 enters first into the first sensor coverage area 235, then into the dual sensor coverage area 279, and then into the second sensor coverage are 239. As a result, the first sensor 234 detects the object 290 movement first, then both the first sensor 234 and the second sensor 238 detects the object 290 movement, and then only the second sensor 238 detects the object 290 movement. If the object 290 moves in the opposite direction of 292, then the reverse occurs. The object 290 enters first into the second sensor coverage area 239, then into the dual sensor coverage area 279, and then into the first sensor coverage are 235. As a result, the second sensor 238 detects the object 290 movement first, then both the first sensor 234 and the second sensor 238 detects the object 290 movement, and then only the first sensor 234 detects the object 290 movement.

The dual sensor motion detector 200 is configured to sense object movement in a variety of configurations based on the sensitivity, accuracy, and energy efficiency required. The dual sensor motion detector 200 may activate only a single sensor and sense object movement when object movement is detected in the activated sensor coverage area; either the first sensor 234 or the second sensor 238 is activated and the activated sensor detects movement. In this configuration, the dual sensor motion detector 200 works similarly to a traditional single sensor passive infrared motion detector.

For improved sensitivity and accuracy with decreased energy efficiency, the dual sensor motion detector 200 senses object movement when object movement is detected in the first sensor coverage area 235 or the second sensor coverage area 239; either the first sensor 234 or the second sensor 238 detects movement. For improved sensitivity and accuracy with decreased energy efficiency, the dual sensor motion detector 200 senses object movement when object movement is detected in the dual sensor coverage area 279; both first sensor 234 and second sensor 238 detect movement at the same time. It is contemplated that when both sensors are active and under low power conditions, the dual sensor motion detector 200 may turn off either the first sensor 234 or the second sensor 238 and utilize only a single sensor for detecting object movement to conserve remaining power and extend the operation time of the dual sensor motion detector 200.

In an alternative embodiment, the dual sensor motion detector 200 senses motion when both the first sensor coverage area 235 and the second sensor coverage area 239 detect movement within a certain period of time. In another alternative embodiment of the dual sensor motion detector 200, the dual sensor motion detector 200 senses object movement when object movement is detected in the first sensor coverage area 235 only, then in the dual sensor coverage area 279 only, and then in the second sensor coverage area 239 only. In yet another alternative embodiment of the invention, the dual sensor motion detector 200 senses object movement when object movement is detected in the second sensor coverage area 239 for a predetermined duration of time; both first sensor 234 and second sensor 238 detect movement at the same time for a duration of time.

Figure 20:
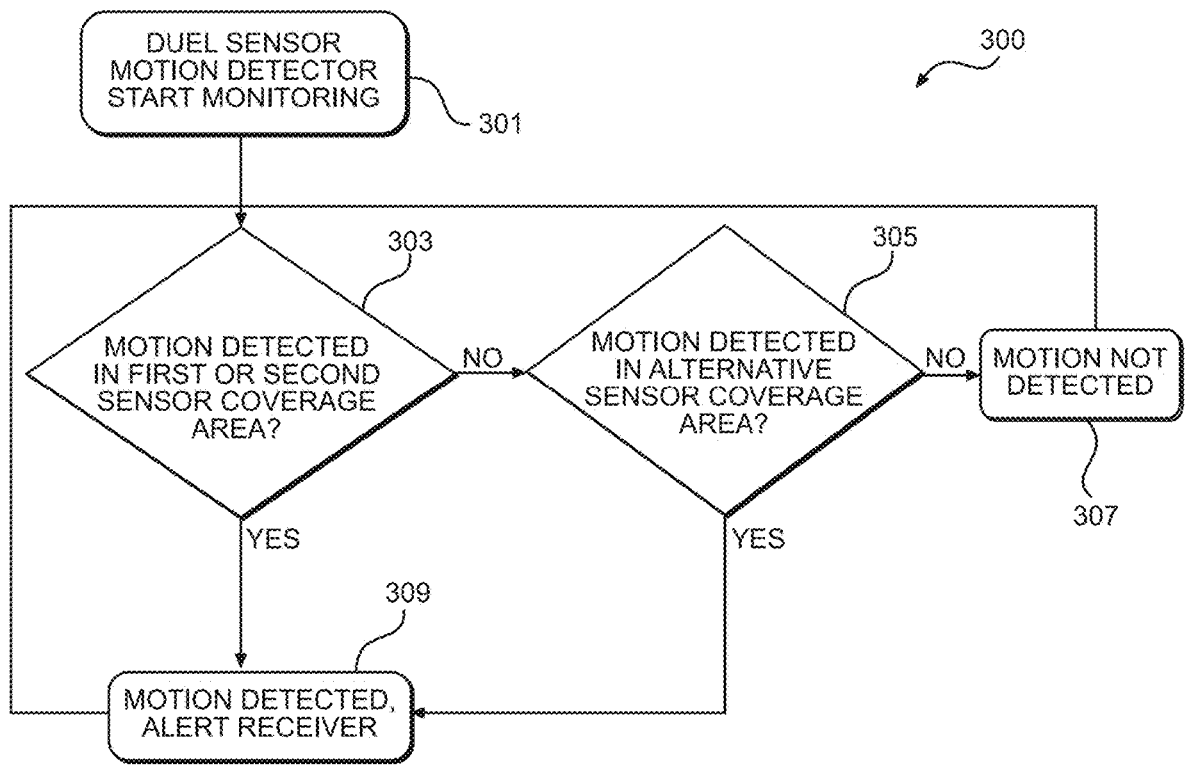
FIG. 20 is an exemplary flow chart of the dual sensor motion detector monitoring process utilizing an OR logic with the first sensor and the second sensor to detect object movement.

Referring now to FIG. 20, an exemplary flow chart of the dual sensor motion detector monitoring process is shown and generally designated 300. The dual sensor motion detector 200 has a variety of configurations based on the sensitivity, accuracy, and energy efficiency required. The dual sensor motion detector 200 is configured to operate the first sensor 234 and the second sensor 238 to detect object movement. The dual sensor motion detector 200 senses object movement when object movement is detected in the first sensor coverage area 235 or the second sensor coverage area 239; either the first sensor 234 or the second sensor 238 detects movement.

The dual sensor motion detector 200 initially starts the dual sensor motion detecting monitoring at step 301 and determines if object movement is detected by the dual sensor motion detector 200 in either horizontal direction. Once initiated, the dual sensor motion detector 200 monitors if object movement is detected in either the first sensor coverage area 235 or in the second sensor coverage area 239 in step 303. If object movement is detected in either the first sensor coverage area 235 or in the second sensor coverage area 239 in step 303, the dual sensor motion detectors 200 then sends an alert to the receiver 100 that movement is detected and the process is looped back to restart the monitoring process in step 309.

If motion is not detected during the first check of the first coverage area, the dual sensor motion detectors 200 then monitors if the alternative coverage area detects object motion in step 305. If the first sensor coverage area 235 has no object movement, then the dual sensor motion detector 200 detects if the second sensor coverage area 239 has object movement, and alternatively if the second sensor coverage area 239 has no object movement then the dual sensor motion detector 200 detects if the first sensor coverage area 235 has object movement. If motion is not detected in the alternative coverage area, no alert is sent and the process is looped back to restart the monitoring process step 307. If motion is detected in the alternative coverage area, the dual sensor motion detectors 200 then sends an alert to the receiver 100 that movement is detected and the process is looped back to restart the monitoring process in step 309. Once initiated, the dual sensor motion detector 200 continually monitors for object motion until it is powered off.

Figure 21:
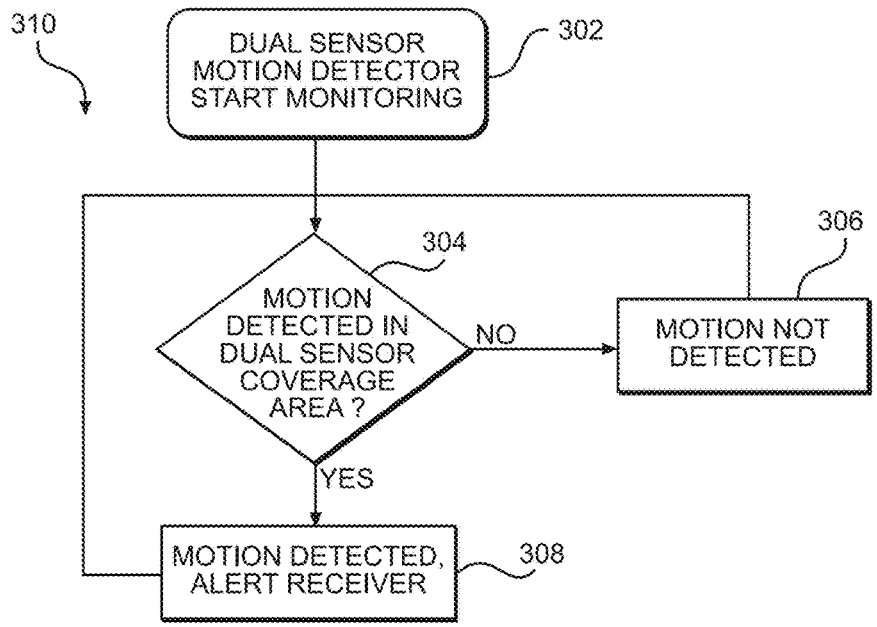
FIG. 21 is an exemplary flow chart of the dual sensor motion detector monitoring process utilizing an AND logic with the first sensor and the second sensor to detect object movement.

Referring now to FIG. 21, an exemplary flow chart of the dual sensor motion detector monitoring process is shown and generally designated 310. The dual sensor motion detector 200 has a variety of configurations based on the sensitivity, accuracy, and energy efficiency required. The dual sensor motion detector 200 is configured to operate the first sensor 234 and the second sensor 238 to detect object movement. The dual sensor motion detector 200 senses object movement when object movement is detected in the dual sensor coverage area 279; both first sensor 234 and second sensor 238 detect movement at the same time.

The dual sensor motion detector 200 initially starts the dual sensor motion detecting monitoring at step 302. Once initiated, the dual sensor motion detector 200 monitors if motion is detected in the dual sensor coverage area 279 in step 304, which calls function "motion detected in dual sensor coverage area?" that is described in further details below in conjunction with FIG. 22. If motion is not detected in the dual sensor coverage area 279, no alert is sent and the process is looped back to restart the monitoring process in step 306. If motion is detected in the dual sensor coverage area 279, an alert is sent to the receiver and the process is looped back to restart the monitoring process in step 308. Once initiated, the dual sensor motion detector 200 continually monitors for object motion until it is powered off.

Figure 22:
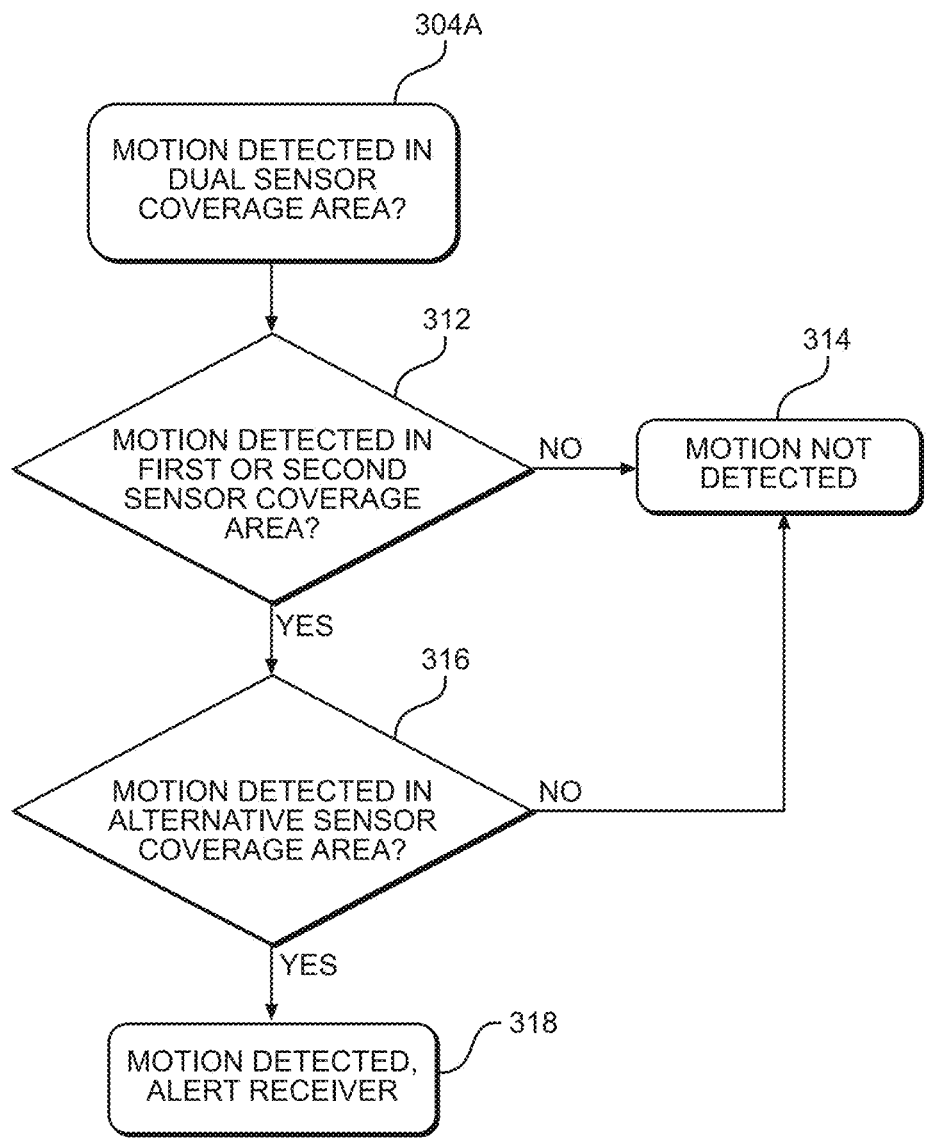
FIG. 22 is an exemplary flow chart of a function to detect motion.

Referring now to FIG. 22, an exemplary flow chart of the function "motion detected in dual sensor coverage area?" is shown and generally designated 304A. The function 304A determines if object movement is detected by the dual sensor motion detector 200 in either horizontal direction. The function 304A is initiated in process 300. Once initiated, the dual sensor motion detector 200 monitors if object movement is detected in either the first sensor coverage area 235 or in the second sensor coverage area 239 in step 312. If motion is not detected in either area, no alert is sent and the process is ended in step 314.

If motion is detected in either area, the dual sensor motion detectors 200 then monitors if the alternative coverage area detects object motion in step 316. If the first sensor coverage area 235 has object movement first, then the dual sensor motion detector 200 detects if the second sensor coverage area 239 has object movement, and alternatively if the second sensor coverage area 239 has object movement first then the dual sensor motion detector 200 detects if the first sensor coverage area 235 has object movement. If motion is not detected in the alternative coverage area, no alert is sent and the process is ended in step 314. If motion is detected in the alternative coverage area, the dual sensor motion detectors 200 then sends an alert to the receiver 100 that movement is detected and the processed is ended in step 318. The process alerts of object movement when both sensors detect movement at the same time.

Figure 23:
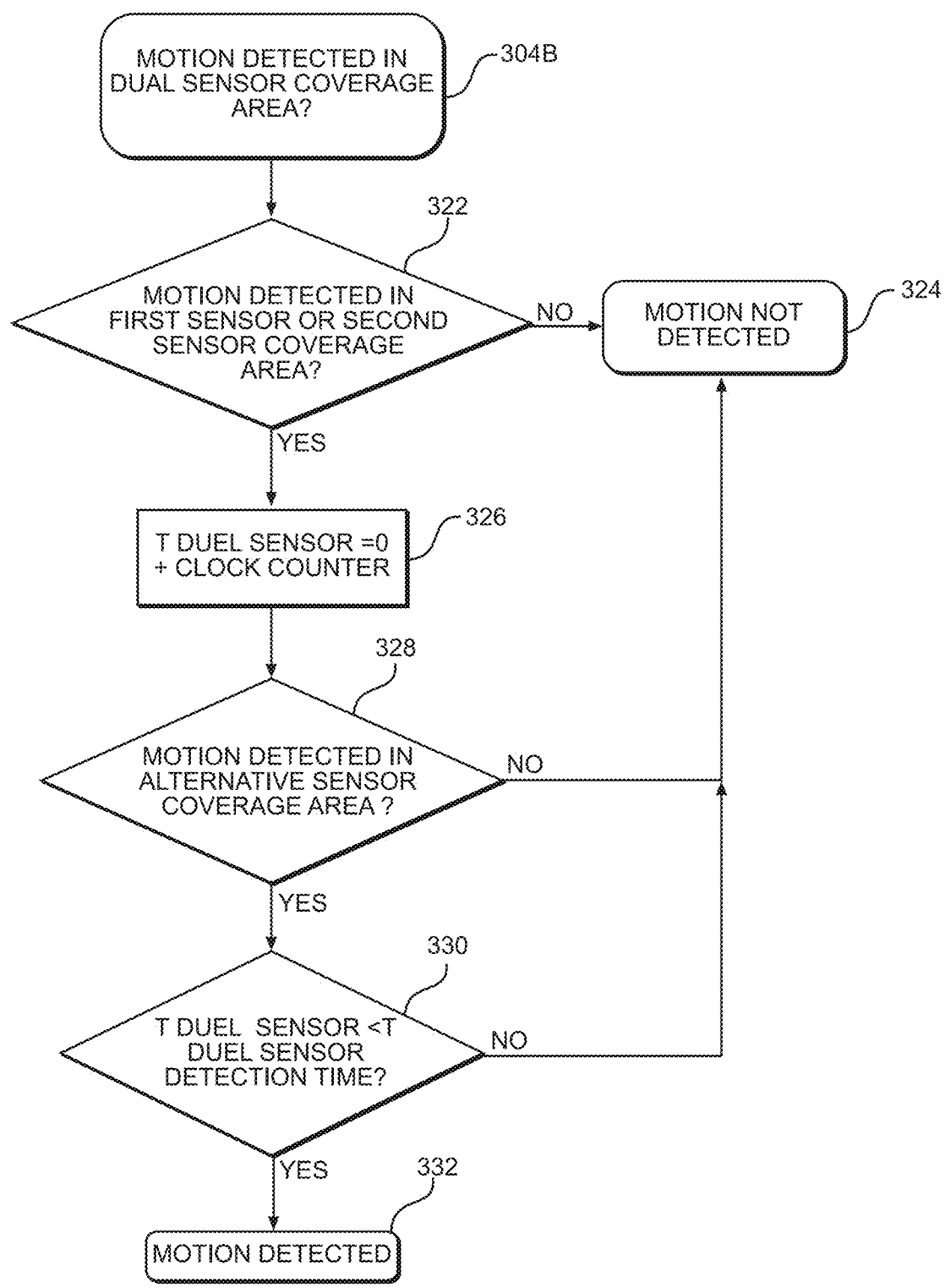
FIG. 23 is an exemplary flow chart of an alternative function to detect motion.

Referring now to FIG. 23, an alternative flow chart of function "motion detected in dual sensor coverage area?" is shown and generally designated 304B. The dual sensor motion detector 200 has a variety of configurations based on the sensitivity, accuracy, and energy efficiency required. The dual sensor motion detector 200 is configured to operate the first sensor 234 and the second sensor 238 to detect object movement. The dual sensor motion detector 200 senses object movement when object movement is detected in the first sensor coverage area 235 and in the second sensor coverage area 239; both first sensor 234 and second sensor 238 detect movement at the same or different times.

The function 304B determines if object movement is detected by the dual sensor motion detector 200 in either horizontal direction. The function 304B is initiated in process 300. Once initiated, the dual sensor motion detector 200 monitors if object movement is detected in either the first sensor coverage area 235 or in the second sensor coverage area 239 in step 322. If motion is not detected in either area, no alert is sent and the process is ended in step 324.

If motion is detected in either area, timer "t dual sensor" is set to zero and begins to accumulate based on a clock counter in step 326. The dual sensor motion detectors 200 then monitors if the alternative coverage area detects object motion in step 328. If the first sensor coverage area 235 has object movement first, then the dual sensor motion detector 200 detects if the second sensor coverage area 239 has object movement, and alternatively if the second sensor coverage area 239 has object movement first then the dual sensor motion detector 200 detects if the first sensor coverage area 235 has object movement. If motion is not detected in the alternative coverage area, no alert is sent and the process is ended in step 324.

If motion is detected in the alternative coverage area, the value of timer "t dual sensor," taken when the alternative coverage area detected object movement, is compared with value "t dual sensor detection time" In step 330. If value "t dual sensor" is less than value "t dual sensor detection time," then the dual sensor motion detector detects motion in step 330 and the process is ended. If value "t dual sensor" is greater than value "t dual sensor detection time," then the dual sensor motion detector does not detect motion in step 330 and the process is ended.

Value "t dual sensor detection time" is a sensitivity adjustment for object movement detection and may be adjusted based on user need. For example, in an exemplary embodiment of the dual sensor motion detector 200, at a viewing angle of between 9 and 12 degrees with a maximum distance of 40 feet, a coverage area of between 6 feet wide and 10 feet wide is provided. Due to distance apart and the rotation of the sensors away from each other, only a portion of the coverage areas overlap, which means the first sensor and the second sensor includes independent coverage areas. Depending on the speed of the object moving across the coverage areas of the deal sensor motion detector 200, the time it takes the object to travel from an independent are of coverage to the dual area of coverage varies. The value "t dual sensor detection time" accounts for this variation.

Figure 24:
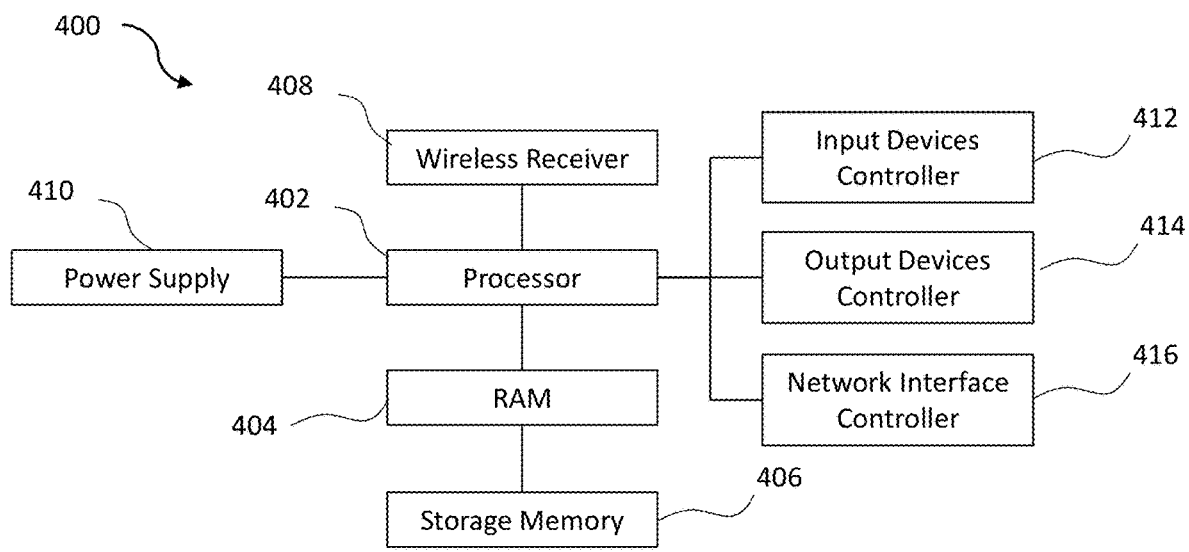
FIG. 24 is a diagram of the electronic components of an alternative embodiment of the receiver of the present invention.

Referring now to FIG. 24, a diagram of electronic components of an alternative embodiment of a receiver of the present invention is shown and generally designated 400. Receiver 400 is substantially similar to the receiver 100 and is configured to communicate with dual sensor motion detector 200. The receiver 400 includes a processor 402, a RAM 404, a storage memory 406, a wireless receiver 408, a power supply 410, an input devices controller 412, an output devices controller 414, and a network interface controller 416. The processor 402 controls the main functions of the receiver 400 with the RAM 404 providing the memory utilized by the processor 402 and various other electronic components to function. Storage memory 406 provides the memory to store settings and other long-term data. It is contemplated that the receiver 400 may also utilize a TCXO clock.

The wireless receiver 408 is configured to receive signals from the dual sensor motion detector 200. Additionally, the wireless receiver 408 has the capability to receive signals from other types of motion sensors as well, such as single sensor motion detectors. The wireless receiver 408 may include a 915 MHz antenna that is matched with the particular motion sensors used. The input devices controller 412, which may be a single component or multiple components, is configured to receive the inputs of the receiver 400. The output devices controller 414, which may be a single component or multiple components, is configured to transmit the outputs of the receiver 400 to various components of the receiver 400.

The network interface controller 416, which may be a single component or multiple components, provides the capability for the receiver 400 to communicate with other devices and networks. The network interface controller 416 may include Wi-Fi, Bluetooth, infrared, near-field communication and any other wireless communication types. In the preferred embodiment, the network interface controller 416 provides Wi-Fi capability for the receiver 400. The network interface controller 416 connects the receiver to existing user networks such as alarm systems, home wireless networks, wireless connected devices, or any other connected networks and devices.

By connecting the receiver 400 to an existing home alarm system, the dual sensor motion detector 200 can be utilized as an additional sensor that monitors the exterior perimeter of a property for intruders that the home alarm system cannot. Typical home alarm system cannot be installed to monitor the exterior perimeter of the property that the home sits on, and in some cases the exterior of the homes, due to their construction. Moreover, home alarm systems have limited range and do not have the capability of monitoring areas more than a few hundred feet away from its receiver. The motion detectors of typical home alarm system have a communication range of a few hundred feet and placing them beyond their communication range will render the motion detectors inoperable. The dual sensor motion detector 200 is housed in weatherproof chassis, made to work in all environments, and have a communication range with the receiver 400 far supposing that of typical home alarm systems. By utilizing the receiver 400 and dual motion detector 200, the capability to detect motion around the perimeter of the property at a much farther range is added to the home alarm system.

By connecting the receiver 400 to a home network with internet access, the receiver 400 may connect with various devices connected to the home network and to devices connected over the Internet. With the dual sensor motion detector 200 located around the exterior perimeter of the property, the receiver 400 may turn on the exterior lights of the house on the property when movement is detected to guide welcomed guests or deter unwelcomed guests. By being connected to the internet through the home network, the receiver 400 may send alerts directly to users that may not be at home. The receiver 400 may send alerts to a computer, a mobile phone, or other portable devices by sending an SMS, MMS, or e-mail over the internet to alert of detected object movement. The receiver 400, may also communicate with proprietary software through the home network with internet access.

The proprietary software may be a mobile application, or App, for use on mobile devices. The App will provide the capability of monitoring the connected motion detectors, past alerts, present alerts, settings, and various other capabilities. The App can also receive communications from the receiver 400, such as motion detection alerts, tow-battery alarms, and malfunctioning motion detectors. Moreover, the App can also receive information from connected devices through the receiver 400. By utilizing the App on a mobile device, such as a mobile phone, a user may monitor the motion detector system 10, the connected devices, and the property anytime and anywhere.

By connecting the receiver 400 to a connected device, such as an Alexa® or Google Home® device, the receiver 400 and the connected device is capable of communicating with one another. The connected device with Alexa® or Google Home® may have home automation technologies to control the thermostat, the lights, and the window blinds, among other capabilities. In one example, a configuration of the dual sensor motion detector 200, the receiver 400, and the connected device may be used to turn on the air conditioning unit of the home on the property to begin cooling down the house on a hot day before the user enters the home. The dual sensor motion detector 200 may be placed at the edge of a property on a driveway and be configured to alert the receiver 400 when a car drives up the driveway towards the property. The receiver 400 may then communicate with the connected device with Alexa® or Google Home® that a vehicle is approaching the property. The connected device with Alexa® or Google Home® may then turn on the air conditioning unit to cool down the house. As the user enters the house, the house is already beginning to cool down without the need for user intervention.

In addition, the connected device with Alexa® or Google Home® may control the operation of the dual sensor motion detector 200 and the receiver 400. The connected device with Alexa® or Google Home® may stop monitoring a particular area covered by a dual sensor motion detector 200 for a certain period of time, such as when a user is expecting a large number of guests to arrive to the property and would like to stop the alerts. A user may verbally control the operation of the connected device with Alexa® or Google Home® by verbally commanding the connected device with Alexa® or Google Home® to "stop monitoring driveway sensor," at which point the receiver 400 will receive the command from the connected device with Alexa® or Google Home® to stop monitoring the dual sensor motion detector 200 monitoring the driveway.

Figure 25:
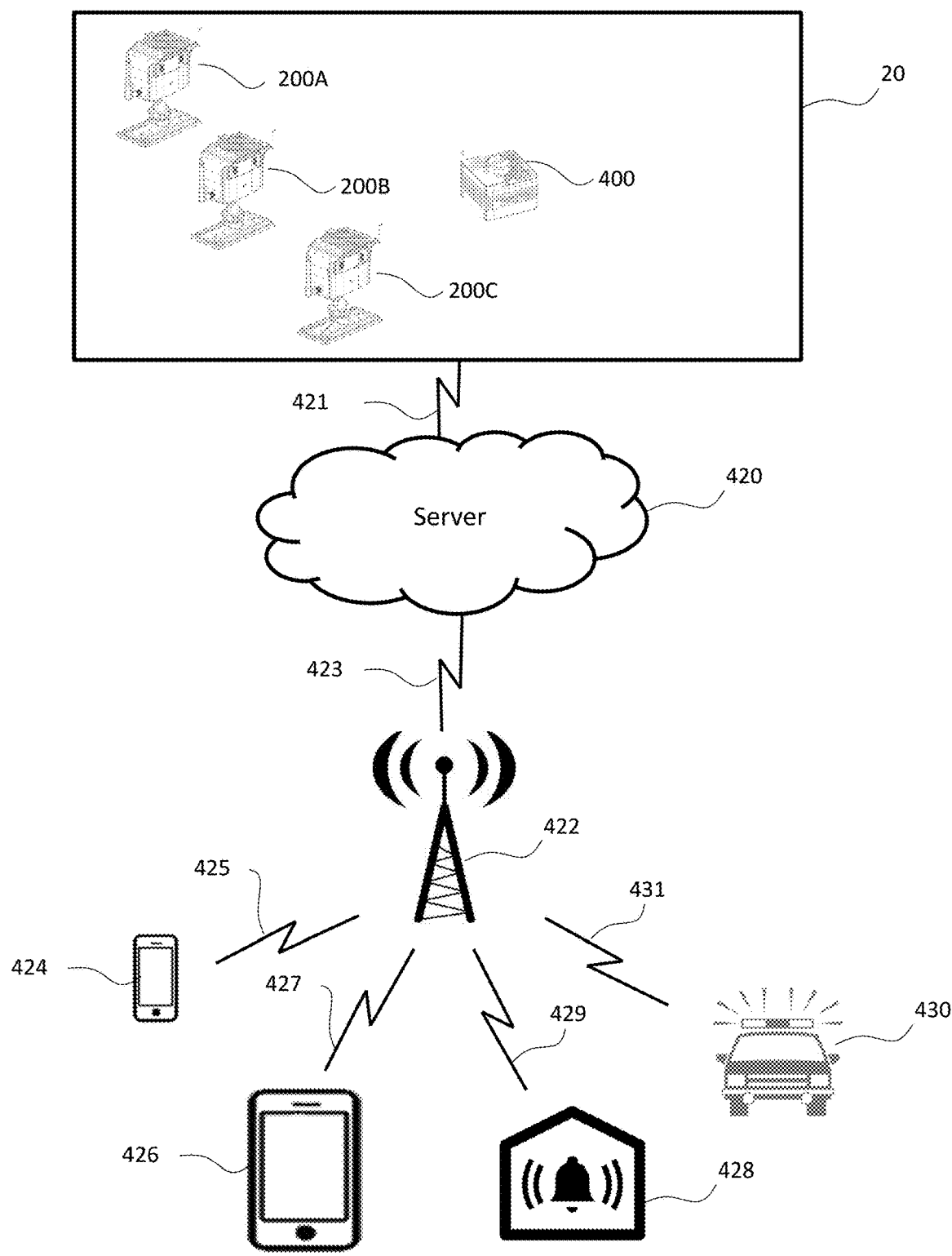
FIG. 25 is a diagram of an alternative embodiment of the motion detection system in communication with a plurality of wirelessly connected devices.

Referring now to FIG. 25, a diagram of an alternative embodiment of the motion detection system 20 in communication with a plurality of wirelessly connected devices is shown. The motion detection system 20 includes three dual sensor motion detectors 200A, 200B, and 200C and the receiver 400. The dual sensor motion detectors 200A, 200B, and 200C are all connected to the receiver 400 and alert the receiver 400 when motion is detected. The motion detection system 20 further includes a server 420 located in the cloud, which communicates through an internet connection 421. The server 420 provides additional services and capabilities for the motion detection system 20, such as communication with various third party devices.

The server 420 helps manage the wireless communication between the various third party devices, such as a cell phone 424, a tablet, 426, an home alarm system company 428, or local law enforcement agencies 430. The server 420 communicates with the third party devices through connect 423. For wireless communication, a cell tower 422 is utilized. The cell tower 422 communicates with the cell phone through wireless connection 425, communicates to the tablet 426 through wireless connection 425, communicates to the home alarm system company 428 through wireless connection 429, and communicates with local law enforcement agencies 430 through wireless connection 431. It is contemplated that communication may also be through wired connections.

Figure 26:
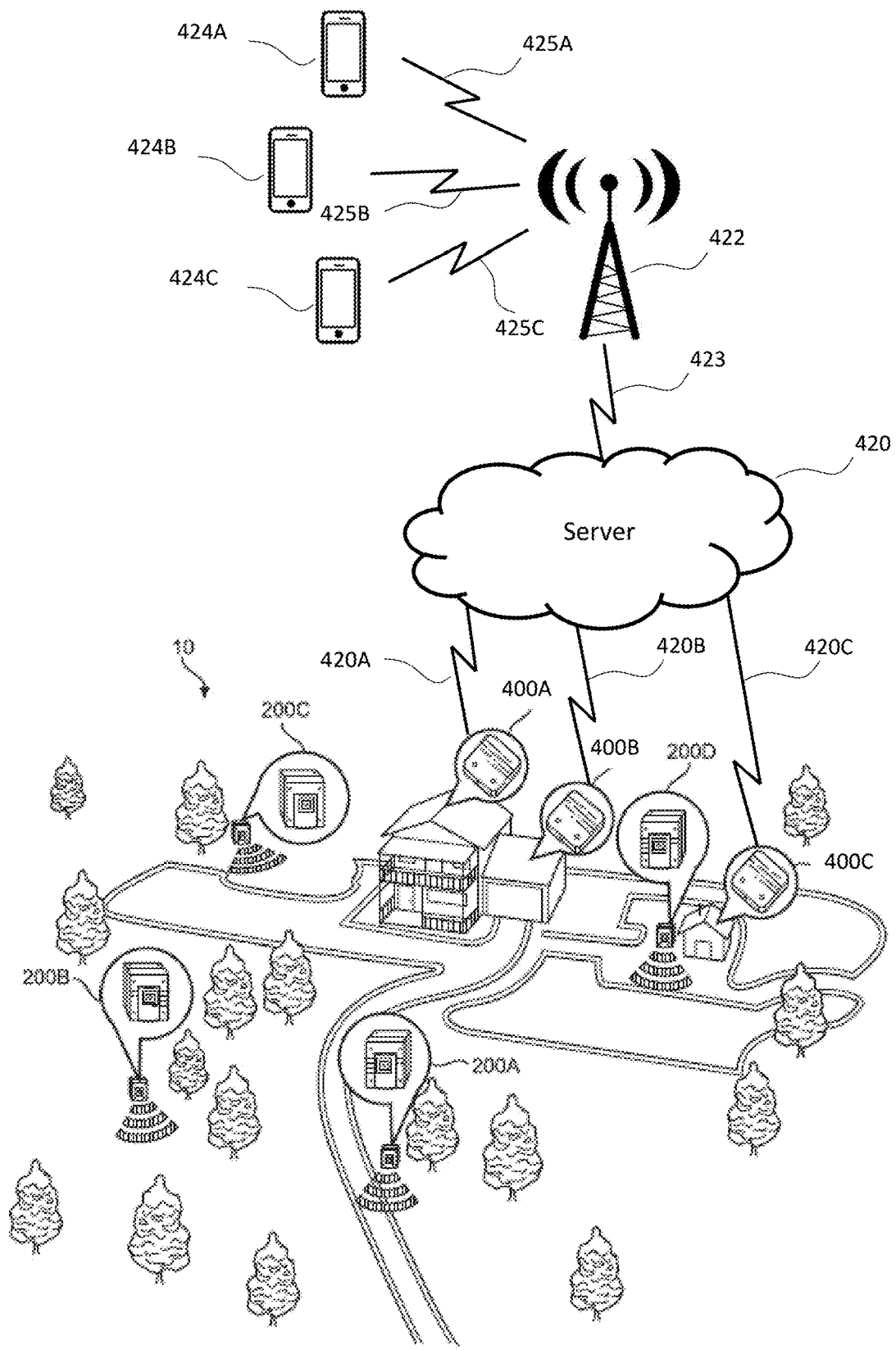
FIG. 26 a diagram the alternative embodiment of the motion detection system in communication with a plurality of mobile phones.

Referring now to FIG. 26, a diagram of the motion detection system 20 is shown. The motion detection system 20 includes a network of receivers 400A, 400B, and 400C in communication with a network of dual sensor motion detectors 200A, 200B, 200C, and 200D. The dual sensor motion detector 200A is capable of communicating with each of the receivers 400A, 400B, and 400C concurrently. The receiver 400A is capable of communication with each of the dual sensor motion detectors 200A, 200B, 200C, and 200D concurrently as well. The receivers 400A, 400B, and 400C are also in communication with the server 420 through internet connection 420A, 420B, and 420C, respectively. The server 420 utilizes the cell tower 422 through connection 423 to communicate with a mobile phone 424A, a mobile phone 242B, and a mobile phone 424C. The cell tower 422 communicates with mobile phone 424A, mobile phone 242B, and mobile phone 424C through wireless connection 425A, 425B, and 425C, respectively.

Each of the dual sensor motion detectors 200A, 200B, 200C, and 200D covers a particular area of the property and each receiver 400A, 400B, and 400C is located within a particular occupant zone. The plurality of dual sensor motion detectors 200A, 200B, 200C, and 200D are in communication with each of the receivers 400A, 400B, and 400C. When dual sensor motion detectors 200A, 200B, 200C, or 200D senses object movement the receivers 400A, 400B, and 400C are simultaneously alerted. The receivers 400A, 400B, and 400C notifies the occupant which dual sensor motion detectors 200A, 200B, 200C, or 200D senses movement, thereby notifying the occupant the particular area of the property movement was detected. Simultaneously, if configured, the receiver may also notify mobile phone 424A, mobile phone 242B, and mobile phone 424C which dual sensor motion detectors 200A, 200B, 200C, or 200D senses movement. The motion detection system 20 provides an expandable system to completely monitor a property.

The placement of the dual sensor motion detector 200A, 200B, 200C, and 200D at a far distance provides the user with sufficient notice of an approaching object. Placing the dual sensor motion detector 200A, 200B, 200C, and 200D in a driveway provides ample notice of visitors entering the property. Placing the dual sensor motion detector 200A, 200B, 200C, and 200D in a field provides notice that wildlife has entered your land. Placing the dual sensor motion detector 200A, 200B, 200C, and 200D in a warehouse alerts a user of potential trespassers during closing hours. By utilizing an appropriate number of dual sensor motion detectors 200A, 200B, 200C, and 200D with receivers 400A, 400B, and 400C, the motion detection system 20 can provide motion detection for large areas not previously capable of being adequately monitored by existing systems and alert the user anytime and anywhere.

While there have been shown what are presently considered to be preferred embodiments of the present invention, it will be apparent to those skilled in the art that various changes and modifications can be made herein without departing from the scope and spirit of the invention.

The invention claimed is:

1. A motion detector comprising:
    a dual sensor chassis including a front defining a first sensor window and a second sensor widow that are spaced apart by a sensor window distance;
    a first motion sensor having a first coverage area and disposed in the chassis to be exposed through the first window;
    a second motion sensor having a second coverage area and disposed in the chassis to be exposed through the second window; and
    a field of view adjustment barrier attached to the front and defining first and second barrier windows, wherein the first barrier window is aligned with the first sensor window, and the second barrier window is aligned with the second sensor window.

2. The motion detector of claim 1, wherein the first and second motion sensors are of the same type.

3. The motion detector of claim 1 wherein the first and second sensors are angled relative to each other such the first and second coverage areas partially overlap to create a dual sensor coverage area and such that portions of the first and second coverage areas do not overlap.

4. The motion detector of claim 3, wherein the first barrier window is smaller than the first sensor window, and the second barrier window is smaller than the second sensor window.

5. The motion detector of claim 4, wherein the first and second motion sensors are passive infrared sensors.

6. A motion detector comprising:
    a chassis having a front, a back, a right side, a left side, a top, and a bottom, said front is formed with a centerline curvature splitting said front into a left half rotated a curvature angle from said centerline curvature and a right half rotated at said curvature angle from said centerline curvature;
    a first sensor attached to said right half of said front, wherein said first sensor is rotated at said curvature angle from said centerline; and
    a second sensor attached to said left half of said front, wherein said second sensor is rotated at said curvature angle from said centerline; wherein
    said first and second sensors have first and second coverage areas, respectively, and said curvature angle causes the first and second coverage areas to partially overlap and create a dual sensor coverage area.

7. The motion detector of claim 6 further comprising a field of view adjustment barrier removably attached to the front and defining first and second barrier windows, wherein the first barrier window is aligned with the first sensor, and the second barrier window is aligned with the second sensor.

8. The motion detector of claim 7, wherein the front defines first and second sensor windows adjacent to the first and second sensors, respectively, and wherein the first barrier window is narrower than the first sensor window and the second barrier window is narrower than the second sensor window.

9. The motion detector of claim 6, wherein said first sensor and said second sensor are passive infrared sensors.

10. The motion detector of claim 6, wherein said curvature angle is five degrees.

11. A motion detector comprising:
    a first sensor rotated a first sensor curvature angle about a first sensor vertical axis;
    a second sensor rotated a second sensor curvature angle about a second sensor vertical axis, wherein said first sensor and said second sensor is separated a sensor window distance apart; and
    wherein motion is detected when said first sensor and said second sensor detect object movement simultaneously.

12. The motion detector of claim 11, wherein said first sensor comprises a first sensor coverage area comprising a first sensor viewing angle and a first sensor viewing distance; and
    wherein said first sensor detects object movement when an object moves within said first sensor coverage area.

13. The motion detector of claim 12, wherein said second sensor comprises a second sensor coverage area comprising a second sensor viewing angle and a second sensor viewing distance; and
    wherein said second sensor detects object movement when an object moves within said second sensor coverage area.

14. The motion detector of claim 11 further comprising:
    a microcontroller in communication with said first sensor and said second sensor;
    a transmitter in communication with said microcontroller; and
    a power supply providing power to said first sensor, said second sensor, said microcontroller, and said transmitter.

15. The motion detector of claim 14 further comprising a sensor chassis, said sensor chassis houses said first sensor, said second sensor, said microcontroller, and said power supply.

16. The motion detector of claim 11 further comprising a sensor chassis housing the first and second sensors and including a front formed with a centerline curvature splitting said front into a left half rotated a front curvature angle from said centerline curvature and a right half rotated at said front curvature angle from said centerline curvature;
- a first sensor window formed into said right half of said front, said first sensor aligned with said first sensor window and attached to said right half of said front;
- a second sensor window formed into said left half of said front, said second sensor aligned with said second sensor window and attached to said left half of said front.

17. The motion detector of claim 16 further comprising a field of view adjustment barrier having a field of view adjustment barrier first sensor window and a field of view adjustment barrier second sensor window, said field of view adjustment barrier is removably attached to said front of said sensor chassis wherein said field of view adjustment barrier first sensor window is aligned with said first sensor window and said field of view adjustment barrier second sensor window is aligned with said second sensor window.

18. The motion detector of claim 17, wherein said field of view adjustment barrier first sensor window is narrower than said first sensor window and said field of view adjustment barrier second sensor window is narrower than said second sensor window.

19. The motion detector of claim 11, wherein said first sensor and said second sensor are of a same type.

20. The motion detector of claim 19, wherein said first sensor and said second sensor are passive infrared sensors.

* * * * *